United States Patent
Richardson et al.

(10) Patent No.: US 9,178,732 B2
(45) Date of Patent: Nov. 3, 2015

(54) BEACON CODING IN WIRELESS COMMUNICATIONS SYSTEMS

(75) Inventors: Thomas Richardson, South Orange, NJ (US); Husheng Li, Knoxville, TN (US); Junyi Li, Chester, NJ (US); Alexander Leonidov, Somerset, NJ (US); Rajiv Laroia, Far Hills, NJ (US); Ravi Palanki, San Diego, CA (US); Gavin Horn, La Jolla, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1518 days.

(21) Appl. No.: 12/446,728

(22) PCT Filed: Oct. 26, 2007

(86) PCT No.: PCT/US2007/082719
§ 371 (c)(1),
(2), (4) Date: Feb. 5, 2010

(87) PCT Pub. No.: WO2008/049136
PCT Pub. Date: Apr. 24, 2008

(65) Prior Publication Data
US 2010/0142365 A1    Jun. 10, 2010

Related U.S. Application Data

(60) Provisional application No. 60/862,185, filed on Oct. 19, 2006, provisional application No. 60/863,123, filed on Oct. 26, 2006, provisional application No. 60/868,658, filed on Dec. 5, 2006, provisional application No. 60/883,541, filed on Jan. 5, 2007.

(51) Int. Cl.
*H04W 72/04*     (2009.01)
*H04J 3/00*      (2006.01)
(Continued)

(52) U.S. Cl.
CPC .............. *H04L 27/10* (2013.01); *H04L 1/0045* (2013.01); *H04L 5/0053* (2013.01); *H04L 5/0091* (2013.01)

(58) Field of Classification Search
CPC ..... H04L 1/0045; H04L 27/10; H04L 5/0043; H04L 5/0053; H04L 5/0091
USPC ........... 370/343, 208, 210; 375/260; 714/759, 714/784
See application file for complete search history.

(56) References Cited

U.S. PATENT DOCUMENTS 5,513,379 A    4/1996  Benveniste et al.
5,983,138 A    11/1999 Kramer
(Continued)

FOREIGN PATENT DOCUMENTS

EP    0983654 A1     3/2000
JP    2000174691 A   6/2000
(Continued)

OTHER PUBLICATIONS

International Search Report—PCT/US2007/082719, International Search Authority—European Patent Office—Mar. 13, 2008.
(Continued)

*Primary Examiner* — Mark Rinehart
*Assistant Examiner* — Gbemileke Onamuti
(74) *Attorney, Agent, or Firm* — Stanton Braden

(57) ABSTRACT

Systems and methodologies are described that facilitate transmitting beacon symbols of a beacon message such that a sequence of symbols can satisfy a linear constraint over a field where the field elements can be identified with carriers. In this regard, a coding scheme can be applied to a beacon message; the coding scheme can produce a plurality of beacon symbols to transmit on given subcarriers. A receiving device of the beacon symbols can decode a beacon message by receiving less than the total number of symbols in a beacon message and determining the remaining symbol subcarriers based on the linear constraint. Thus, more efficient decoding of beacons is facilitated as well as resolving beacon ambiguity by figuring out which symbols satisfy linear constraints for the symbols, and resolving time and frequency shift by detecting an offset that would result in satisfaction of the linear constraint.

102 Claims, 13 Drawing Sheets

(51) Int. Cl.
*H04L 27/10* (2006.01)
*H04L 1/00* (2006.01)
*H04L 5/00* (2006.01)

(56) References Cited

U.S. PATENT DOCUMENTS

| | | | |
|---|---|---|---|
| 6,078,571 A | 6/2000 | Hall | |
| 6,151,512 A | 11/2000 | Chheda et al. | |
| 6,370,671 B1* | 4/2002 | Pan et al. | 714/784 |
| 6,456,611 B1 | 9/2002 | Hu et al. | |
| 6,771,706 B2 | 8/2004 | Ling et al. | |
| 7,162,679 B2* | 1/2007 | Liberol et al. | 714/759 |
| 7,272,188 B2* | 9/2007 | Lacroix-Penther et al. | 375/260 |
| 7,286,603 B2* | 10/2007 | Varshney et al. | 375/260 |
| 7,633,923 B2* | 12/2009 | Gorokhov et al. | 370/343 |
| 8,068,841 B2 | 11/2011 | Laroia et al. | |
| 8,559,295 B2* | 10/2013 | Thomas et al. | 370/208 |
| 2004/0109432 A1 | 6/2004 | Laroia et al. | |
| 2004/0228389 A1 | 11/2004 | Odenwalder | |
| 2006/0114816 A1* | 6/2006 | Maltsev et al. | 370/210 |
| 2006/0209670 A1 | 9/2006 | Gorokhov et al. | |
| 2006/0209973 A1 | 9/2006 | Gorokhov et al. | |
| 2008/0095108 A1 | 4/2008 | Malladi et al. | |
| 2008/0247479 A1* | 10/2008 | Ma et al. | 375/260 |
| 2010/0046447 A1 | 2/2010 | Palanki et al. | |
| 2010/0309853 A1 | 12/2010 | Richardson et al. | |

FOREIGN PATENT DOCUMENTS

| | | |
|---|---|---|
| JP | 2006501709 T | 1/2006 |
| JP | 2006295751 A | 10/2006 |
| KR | 20060082434 A | 7/2006 |
| RU | 2154901 | 8/2000 |
| TW | I257788 | 7/2006 |
| TW | I258963 | 7/2006 |
| TW | I260870 | 8/2006 |
| TW | I263449 | 10/2006 |
| WO | 9637970 A1 | 11/1996 |
| WO | 2004030264 A1 | 4/2004 |

OTHER PUBLICATIONS

Stolpman, V.J. et al: "Approaches to adaptive Reed-Solomon coding for OFDM systems" Vehicular Technology conference, 2005. VTC-2005-Fall. 2005 IEEE 62nd, vol. 1, Sep. 25-28, 2005 pp. 453-457, XP002471518 p. 453, right-hand column, line 4 paragraph (00IV) figure 1.

International Search Report—PCT/US07/082719, International Search Authority—European Patent Office—Mar. 13, 2008.

Written Opinion—PCT/US07/082719, International Search Authority—European Patent Office—Mar. 13, 2008.

\* cited by examiner

BEACON CODING IN WIRELESS COMMUNICATIONS SYSTEMS

CROSS-REFERENCE TO RELATED APPLICATIONS

This application claims the benefit of U.S. Provisional Patent application Ser. No. 60/862,185 entitled "BEACON CODING SCHEME" which was filed Oct. 19, 2006, U.S. Provisional Patent application Ser. No. 60/863,123 entitled "CODE FOR BEACONS IN A WIRELESS COMMUNICATION SYSTEM" which was filed Oct. 26, 2006, U.S. Provisional Patent application Ser. No. 60/868,658 entitled "BEACONS IN A WIRELESS COMMUNICATION SYSTEM" which was filed Dec. 5, 2006, and U.S. Provisional Patent application Ser. No. 60/883,541 entitled "BEACONS IN A WIRELESS COMMUNICATION SYSTEM" which was filed Jan. 1, 2007. The entirety of the aforementioned applications is herein incorporated by reference.

BACKGROUND

I. Field

The following description relates generally to wireless communications, and more particularly to encoding beacon symbols for more efficient decoding and resolution thereof in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. The antennae can relate to both base stations (e.g. access points) and mobile devices (e.g. access terminals) in one example, where the base station can provide communication channels to the mobile devices. Base stations can transmit beacon signals for interpretation by the mobile devices in an attempt to identify the base station and/or a transmission carrier or sector thereof. The beacon symbols are sent at a given time in a superframe thus giving way to beacon collision as the number of in-range sectors increases beyond a number of available subcarriers. Additionally, as more information is desired to transmit in a beacon and as the number of transmitting devices grows in a given area, mobile devices can become overloaded with beacon messages to decode and can often drop the messages it cannot handle.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating encoding of beacon messages sent by base stations or sectors thereof. In particular, the beacon messages can be encoded as a plurality of beacon symbols satisfying certain conditions or constraints over a field to allow for efficient decoding of the symbols given an incomplete set of symbols, as well as efficient and accurate resolution of colliding symbols and time/frequency offset.

According to related aspects, a method that facilitates transmitting a beacon message as a plurality of beacon symbols is described herein. The method can comprise encoding a beacon message as a plurality of beacon symbols such that a number of symbols, less than the total number for the beacon message, can be utilized to determine remaining symbols of the beacon message. The method can also comprise transmitting the plurality of beacon symbols over respective subcarriers at assigned symbol periods.

Another aspect relates to a wireless communications apparatus. The wireless communications apparatus can include at least one processor configured to encode a beacon message as a plurality of beacon symbols such that upon resolving a number of symbols, less than the total number for the beacon message, the beacon message becomes deterministic. The wireless communications apparatus can also include a memory coupled to the at least one processor.

Yet another aspect relates to a wireless communications apparatus that encodes and transmits beacon symbols of a beacon message. The wireless communications apparatus can include means for initializing a beacon message and means for encoding the beacon message into a plurality of beacon symbols according to a coding scheme, wherein the coding scheme can be solved from a portion of the symbols less than the total number of symbols. Additionally, the wireless communications apparatus can comprise means for transmitting the beacon symbols on corresponding subcarriers in periodic time slots.

Still another aspect relates to a computer program product, which can have a computer-readable medium including code for causing at least one computer to initialize a beacon message with information regarding a transmitter of the beacon message. The code can also cause the at least one computer to encode the beacon message to a plurality of beacon symbols to be sent out on subcarriers indicative of information, the beacon symbols being chosen according to a coding scheme where the beacon message can be decoded by obtaining a portion of the beacon symbols. Moreover, the code can cause at least one computer to transmit the beacon symbols on the subcarriers at determined symbol periods.

In accordance with another aspect, an apparatus in a wireless communication system can include a processor configured to encode a beacon message into a plurality of beacon symbol positions according to a plurality of available positions, relate the available positions to a field such that receiving a portion of the beacon symbol positions can render the rest of the beacon message deterministic by satisfying a linear constraint on the field, and transmit the beacon symbols. Also, the apparatus can include a memory coupled to the processor.

According to a further aspect, a method for receiving a portion of beacon symbols that are utilized to decode a beacon message is described as well. The method can comprise receiving a partial subset of encoded beacon symbols of a beacon, a subcarrier position of the encoded beacon symbol satisfies a linear constraint over a field related to the total number of subcarrier positions useable for beacon symbols. Additionally, the method can comprise determining information regarding the encoded beacon symbols based at least in part on the subcarrier position of the encoded beacon symbols and the resulting solution to the linear constraint.

Another aspect relates to a wireless communications apparatus. The wireless communications apparatus can include at least one processor configured to receive a subset of encoded beacon symbols of a beacon message, wherein a subcarrier position of the encoded beacon symbol satisfies a linear constraint over a field related to the total number of subcarrier positions useable for beacon symbols. The wireless communications apparatus can also include a memory coupled to the at least one processor.

Yet another aspect relates to a wireless communication apparatus for determining a beacon message based on a subset of received beacon symbols. The apparatus can comprise means for receiving a number of beacon symbols of a single beacon message less than the total number of beacon symbols in the beacon message. The apparatus can also include means for satisfying a linear constraint over a field related to a total number of available subcarriers for the beacon message based on the subcarrier positions of received beacon symbols. The apparatus can further include means for determining the remaining beacon symbols in the beacon message based on the linear constraint.

Still another aspect relates to a computer program product, which can have a computer-readable medium including code for causing at least one computer to receive an incomplete set of beacon symbol broadcasts related to a beacon message, the beacon symbols satisfy a linear constraint over a field related to usable subcarriers for transmitting the beacon symbol broadcasts. The code can also cause at least one computer to solve the linear constraint with respect to the incomplete set of beacon symbol broadcasts to determine remaining beacon symbols in the beacon message.

In accordance with another aspect, an apparatus can be provided in a wireless communication system including a processor configured to receive an incomplete set of beacon symbols related to a beacon message. The processor can also be configured to determine remaining beacon symbols of the beacon message based on utilizing the received beacon symbols to satisfy a linear constraint over a field and decode the beacon message to discern information about a transmitting sector thereof. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
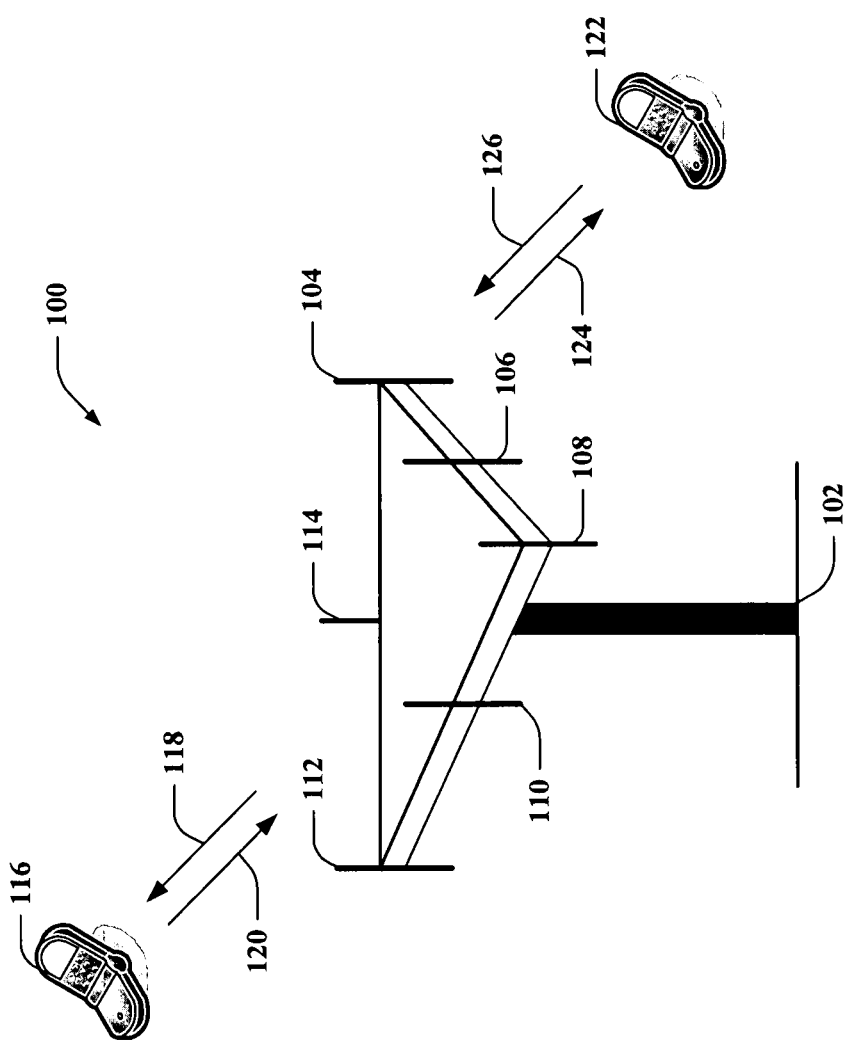
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band from that used by reverse link 120, and forward link 124 can employ a different frequency band from that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In one example, the base station 102 can send a beacon message or codeword from each antenna 104, 106, 108, 110, 112, and 114, and/or a grouping of antennae comprising information regarding the antenna and/or corresponding base station 102, such as identification information and/or other metrics or general information associated with the antennae and/or base station 102. A beacon message or codeword, or more generally beacon, is a signal sent using substantially all available power to reach devices having low to high signal to noise ration (SNR); the beacon message or codeword can comprise identification information to allow the disparate devices to identify a sector to which the beacon relates. The beacon message or codeword can be represented by a number of beacon symbols (which can be OFDM symbols in one example) transmitted in a beacon pattern or sequence. The beacon pattern is represented by the plurality of beacon symbols sent to convey the information in the beacon message and can be a repeating or infinite pattern in various examples.

According to an example, the mobile devices 116 and 122 can receive one or more beacon symbols and decode them to discern information related to the antennae, an associated sector, base station 102, and/or an underlying system or network; in one example, the beacon symbol can be one of the first signals the mobile devices 116 and 122 can interpret regarding a base station 102 or antenna (such as on power-up or moving within broadcast range, for example). To this end, a beacon symbol can be sent so that it is easily identifiable by the mobile devices 116 and 122. In one example, the beacon symbols can represent an entire beacon codeword, which can be a plurality of beacon symbols indicative of information, or pattern, a portion of which can be required before properly decoding. According to an example, the base station 102 can send a beacon symbol from a given antenna 104, 106, 108, 110, 112, and/or 114 by transmitting substantially all available power on a single subcarrier channel thereof (or a small number of channels). The mobile devices 116 and/or 122 can receive the signal and perform a fast Fourier transform (FFT), or other decoding algorithm, on the signal to determine that one channel has a very high frequency as compared to the others. The mobile devices 116 and/or 122 can conclude that this is a beacon symbol related to a given antenna, sector, base station 102, and/or underlying network or system and interpret the symbol accordingly. Additionally, the mobile devices 116 and 122 can conclude that the beacon symbol is one of collection of symbols used in a beacon codeword, for example.

To facilitate operability with a plurality of antennas (as shown in the figure) and/or a plurality of base stations (not shown), the base station 102 can uniquely identify itself by having an associated beacon code that is broadcast to mobile device 116 and 122 that are in-range. The beacon code represents the manner by which the beacon message is encoded; this information can allow a receiver of the beacon message, or a symbol thereof, to predict specifics about the beacon message as are described herein. The beacon code can be a single symbol sent each superframe where the symbol is broadcast on a unique subcarrier. Additionally, the beacon code can be a plurality of such symbols broadcast on different subcarriers each period to represent a beacon codeword or pattern from which information about the transmitter of the beacon codeword can be derived by the mobile devices 116 and 122. The symbols to broadcast, the subcarriers on which to broadcast, and the order thereof can be specified when encoding the beacon and can be based at least in part on the desired beacon message and a time index for the symbol, in one example.

A beacon code, in accordance with aspects described herein, can be designed to allow a mobile device 116 and 122 to quickly identify a base station 102 by a broadcast beacon without necessarily receiving all symbols of the beacon codeword. Additionally, the beacon coding schemes described infra can allow a mobile device 116 and 122 to disambiguate beacons where a plurality of symbols are received relating to one or more transmitters. Moreover, beacon codes disclosed below can allow a mobile device 116 and 122 to detect frequency shift in the device and appropriately correct the shift to interpret the beacon codes as transmitted as well as allow for many symbols to be read and decoded by the mobile devices 116 and 122. In this regard, mobile devices 116 and 122 can expand its options for base stations 102 to which to connect by broadening the amount of beacons it can interpret.

Figure 2:
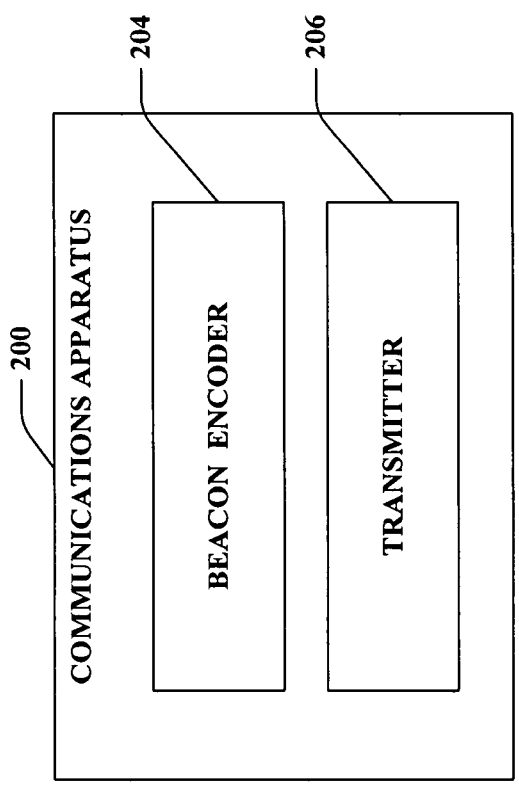
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that transmits one or more beacon symbols. The communications apparatus 200 can include a beacon encoder 204 that encodes a beacon message as one or more beacon symbols (such as a beacon OFDM symbol) and a transmitter 206 that broadcasts the beacon symbol or plurality of symbols. In one example, the communications apparatus 200 can formulate a beacon message and encode the message, using the beacon encoder 204, into one or more symbols that relate to information regarding the communications apparatus 200, for example. The beacon can be sent in a synchronous or asynchronous configuration and can have different properties for identification thereof depending on the configuration, in one example. The communications apparatus 200 can transmit the beacon symbols over the transmitter 206 at specified time intervals (and for specified time periods, in one example). In this regard, devices can receive the beacon as one or more of the transmitted symbols and discern information about the communications apparatus 200 according to an example.

In one example, a beacon symbol can be transmitted by the transmitter 206 for a given period of time, such as between two symbol periods, to ensure that devices can receive the entire symbol even if the device is incorrectly timed or in an asynchronous configuration. After receiving a number of beacon symbols that comprise a beacon signal (e.g., a beacon message or codeword), the device can be able to self-correct or adjust its timing to communicate in the wireless system to which the communications apparatus 200 is a part. The beacon signals can have some properties in this regard that are known to the device. For example, the symbols of the beacon signal can transmit at a given interval (periodic) and/or in each superframe (during one or more symbol periods) in an OFDM configuration.

According to an example, beacon symbols can be chosen for a desired beacon signal that convey information about the beacon or a transmitter thereof. The symbols can be chosen, determined, or otherwise provided to satisfy a number of properties. The properties can be known by the mobile devices or other apparatuses in the network or system to effectively interpret the various beacon signals being broadcast. For example, by interpreting and decoding a requisite number of beacon symbols in the beacon, where the requisite number can be less than the total number of symbols in the signal, the device can identify the communications apparatus 200 sending the signal. For example, a beacon for a communications apparatus having a period of 18 can be completely decoded and become deterministic to a device after decoding 3 out of 8 consecutive symbols, for example. This will be described in further detail below. It is to be appreciated that the number of symbols in a beacon signal can be definite and periodically transmitted or indefinite in one example. Another property of the beacon signal sent by a communications apparatus, and known by a device, can enable a device to disambiguate two or more beacon signals being transmitted concurrently. Using the coding schemes described below, the communications apparatuses 200 can send the beacons such that a device hearing the plurality of beacons can receive a requisite number of symbols from each beacon and determine time periods for one or more of the beacons. The requisite number, again, can be less than the total number of symbols in the signal allowing the device to efficiently achieve the foregoing functionality.

According to yet another example, a property of a beacon coding scheme used by a beacon encoder 204 to encode a beacon message of a communications apparatus 200, as shown herein, can allow one or more devices to correct an offset frequency component or timing component. Since beacon coding scheme properties can be known to the mobile device, beacons sent by one or more communications apparatuses 200 that are offset by frequency and/or time can be easily detected after receiving a number of symbols in the beacon signal, for example. It is to be appreciated that the foregoing properties can allow mobile devices to hear a number of beacons from communications apparatuses 200 and facilitate efficiently discerning information about the transmitters (communications apparatuses 200) thereof so a maximum number of beacons can be heard and decoded, and effective decisions can be made regarding which communications apparatus(es) 200 to communicate with.

Figure 3:
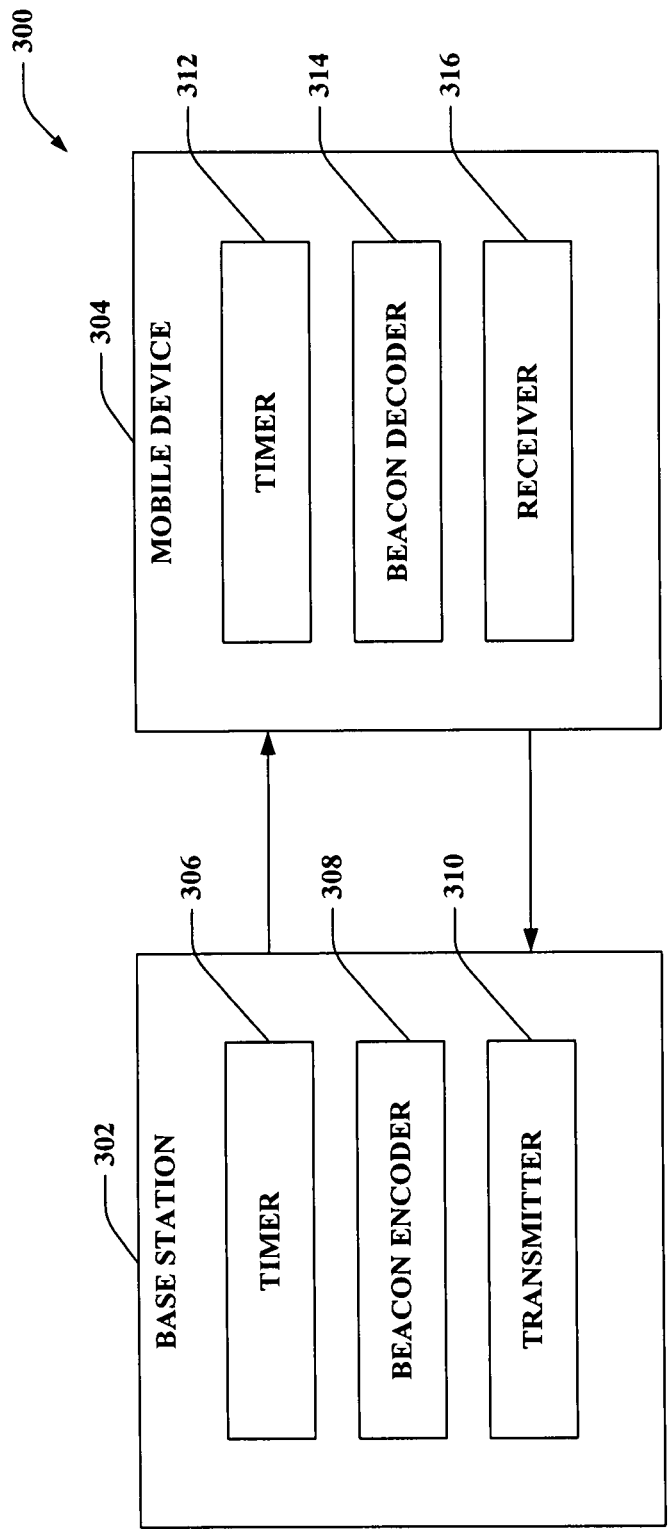
FIG. 3 is an illustration of an example wireless communications system that effectuates transmitting beacon symbols encoded by a coding scheme.

Now referring to FIG. 3, illustrated is a wireless communications system 300 that effectuates encoding beacons for one or more base stations. System 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, in one example.

Base station 302 can include a timer 306 that can facilitate communicating in a synchronized environment or sending symbols for given time periods in asynchronous systems, for example. The base station 302 can also include a beacon encoder 308 that encodes a beacon message as a plurality of symbols that can be transmitted by a transmitter 310. As described previously, the beacon code can relate to, and be chosen based on, the beacon message to be sent as well as a time index, for example. It is to be appreciated that the beacon message can comprise an identifier for the base station 302 or one or more sectors thereof, a preferred carrier, and/or other information about the beacon and/or transmitting entity. In one example, the transmitter 310 can broadcast the beacon, and/or symbols thereof, for a given period of time (leveraging the timer 306 to determine the time), such as in two time periods (double the length of a symbol period) to ensure that mobile devices 304 powering up can receive and decode the beacon symbol even if they are offset by time or frequency, for example.

The mobile device 304 can comprise a timer 312 that facilitates communicating in a synchronized environment or calibrating to base stations 302 in asynchronous environments by measuring sending times and durations, for example. The mobile device 304 can also comprise a beacon decoder 314 that decodes beacons and/or symbols thereof, according to properties known about the beacons, and a receiver 316 that receives communications from a base station 302 (including beacon symbols). In one example, the receiver 316 of the mobile device 304 can receive a plurality of beacon symbols from a base station 302, for example; the beacon symbols can be a portion of an entire beacon. The mobile device 304 can decode one or more of the received symbols using the beacon decoder 314 and determine information about the base station 302 that sent the beacon (and/or a sector or transmitter thereof). Additionally, the timer 312 can be evaluated to provide additional information about the beacon and/or be calibrated based on the beacon in one example.

According to an example, the base station 302 can encode a beacon message using the beacon encoder 308 to comprise information regarding the base station 302; the beacon encoder 308 chooses the symbols based on the information to be transmitted, for example. The base station 302 can transmit the beacon symbols out on the transmitter 310 at a point in time and for a duration of time utilizing the timer 306. The time can be twice that of a normal period to ensure that mobile devices 304 just powering-up can receive the beacon in an entire window. For example, a mobile device 304 powering-up can initially have an offset timer 312. After receiving a requisite number of beacon symbols of a given beacon signal (as discussed previously) through the receiver 316, the mobile device 304 can determine the entire beacon signal (e.g., determine the remaining symbols of the beacon signal or message) and decode the signal using the beacon decoder 314. After discovering information stored in the beacon symbols, the mobile device 304 can calibrate its timer 312 according to the beacon, for example. Additionally, the powered-up mobile device can initially have an offset frequency radio or crystal as well. This can also be calibrated after receiving and decoding a requisite number of beacon symbols of a beacon codeword, for example. Since the mobile device 304 can know patterns of the beacons, it can easily detect an offset beacon sequence in this regard after receiving a few symbols, for example, and efficiently correct its frequency portion or timer 312.

In one example, beacons can be transmitted every 90 milliseconds on one of a plurality of available tones in a bandwidth. The beacon encoder 308 can encode desired information by selecting one or more beacon symbols for transmission and map the symbols to tones in a frequency domain. The base station 302 can transform the tones to a time domain (such as by using an inverse fast Fourier transform), for example and transmit the data over the transmitter 310. The symbols for the beacon can be selected according to properties described herein and known by the mobile device 304, for example. The mobile device 304 can receive the beacon data by the receiver 316 and transform it to a frequency domain (such as by using a fast Fourier transform), for example, and decode the beacon using the beacon decoder 314. Again, it is to be appreciated that the beacon can be decoded from one or more symbols that can represent a portion or the entire beacon; however, the coding schemes disclosed herein allow the beacon to be decoded from a small number of symbols. Upon decoding a sufficient portion of the beacon, the remainder of the symbols to be transmitted by the base station 302 and received by the mobile device 304 can be deterministic. Using the properties of the beacon symbols, the mobile device 304 can quickly detect a sector from a portion of the beacon using low complexity encoding and decoding mechanisms, decode the beacon in absence of time information (since it can know the valid beacon sequences), decode in the presence of collisions when two or more beacon symbols are received at the same time, and decode though the frequency of the mobile device 304 may be offset.

Figure 4:
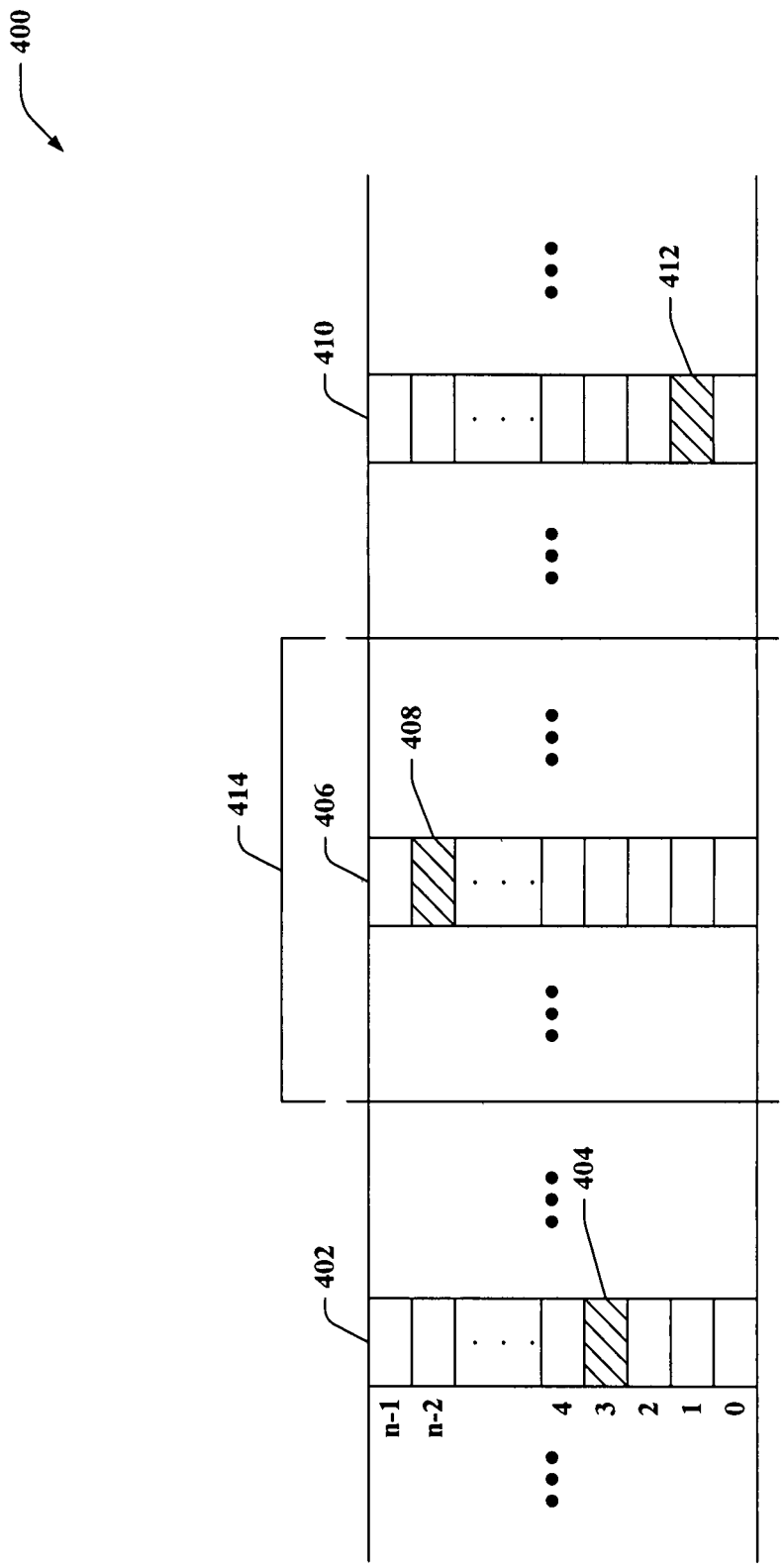
FIG. 4 is an illustration of example superframes and symbol periods utilized in wireless communications systems.

Now referring to FIG. 4, a representation of a bandwidth over a period of time 400 is displayed for a given transmitter (such as a base station or sector/carrier thereof, for example). The bandwidth is represented by a plurality of subcarriers for given symbol periods 402, 406, and 410, and the time periods can be separated into one or more superframes 414, which can have predetermined time durations for example. Each of the shown symbol periods 402, 406, and 410 can broadcast beacon symbols 404, 408, and 412, respectively, represented as substantially the only OFDM symbol in the symbol period utilizing power (which can be substantially all the power that is available since the other symbols are not powered). As shown, the beacon symbol 404, 408, and/or 412 can be transmitted on different subcarriers and/or at different time periods each superframe 414; the chosen subcarrier(s) can represent desired information, such as the beacon message, which can be a forward beacon pilot channel (F-BPICH) in one example.

It is to be appreciated that multiple beacon symbols can be transmitted per superframe; also, one or more superframes can be skipped and not transmit a beacon symbol as well. In one example, the beacon can be periodic over a time frame such that it can transmit at an interval for a given time period. As mentioned, the beacon can be a plurality of beacon symbols transmitted at intervals where frequencies chosen for transmission (e.g. subcarriers 404, 408, and/or 412) can indicate information about the beacon or a transmitting entity, for example. In this regard, a coding scheme is presented that can have the properties described above that allow mobile devices to efficiently detect information about the transmitter of the beacon in the middle of the beacon transmission, based on a minimal number of beacon symbols, in the face of collisions, and when the mobile device might be in need of calibration with respect to time and/or frequency.

In one example, the subcarriers of each symbol period 402, 406, and 410 can be enumerated as a prime number n of channels (e.g. 0 . . . n−1 as shown), and the beacon subcarrier can be interpreted by a receiver as the enumeration modulo the prime number of subcarriers. It is to be appreciated that the subcarriers can be substantially all available subcarriers for transmitting beacon symbols for a carrier. Additionally, however, the subcarriers can be broken into n groups; the available subcarriers can either be the subcarriers in a given group or the group. The coding scheme can be used to choose the group of subcarriers. In this regard, algebraic conditions can be satisfied over the field allowing the desired properties to be attained in part by measuring offsets. Thus, the sequence of beacon symbols can be selected such that selecting or receiving a requisite number of symbols in a row can substantially satisfy an equation over the field rendering the rest of the symbols in the beacon deterministic. This also allows offset frequencies to be detected and adjusted as the requisite number of symbols will not exactly satisfy the equation, but can produce an offset that can be used to adjust the frequency of the receiver, for example.

According to one example, an algorithm can be deterministic in that some number of n beacon positions in a row satisfy a linear constraint, which exists over a field where the field elements can be identified with the subcarriers. Thus, upon receiving a requisite number of symbols in a row, the symbols can satisfy the linear constraints (e.g. the coefficients can add up to zero) and the rest of the symbols in the beacon (or the field) can be determined. For example, in a 1.25 MHz F-OFDM configuration, there are 113 tones, or subcarriers, that can be utilized for transmission in a symbol period. The tones can be broken up into 3 subsets of 37 (prime number) tones, or subcarriers (n=37 as shown with respect to subcarrier 402, for example). A given beacon symbol position can be taken modulo 37 such that there can be 3 possible locations for the symbol. This information can be used to modulate further information, to create redundancy by using all 3 of the tones that have the same value modulo 37, and/or conserve power and allow more efficient operation by using only ⅓ of the tones, for example. In this example, a period of 18 symbols for a beacon can be chosen rendering $36^3/18=2592$ beacon sequences.

According to this example, a primitive element of the multiplicative group Z/37 can be chosen as a symbol such that log:[1 . . . 36]→[0 . . . 35] and its inverse exp are defined. Then, $p_1$, $p_2$, and $p_3$ can be distinct primitive elements of Z/37 (and any one of them can be the element used to define the log and exp above). Accordingly, a, b, and c can be defined by $(x-p_1^2)(x-p_2^2)(x-p_3^2)=x^3-ax^2-bx-c$. The following variables can also be defined:

$$M = \begin{bmatrix} 0 & 1 & 0 \\ 0 & 0 & 1 \\ a & b & c \end{bmatrix},$$

$$B = \begin{bmatrix} 1 & 1 & 1 \\ p_1^2 & p_2^2 & p_3^2 \\ p_1^4 & p_2^4 & p_3^4 \end{bmatrix},$$

$$\Lambda = \begin{bmatrix} p_1^2 & 0 & 0 \\ 0 & p_2^2 & 0 \\ 0 & 0 & p_3^2 \end{bmatrix},$$

$$V = \begin{bmatrix} \log p_1 & 0 & 0 \\ \log p_2 & 1 & 0 \\ \log p_3 & 0 & 1 \end{bmatrix}.$$

Thus, given three consecutive beacon symbols, $z_1$, $z_2$, and $z_3$, in the 18 symbol beacon codeword, the next symbol, $z_4$ can be determined by $z_4=az_1+bz_2+cz_3$. Denoting $z^t=(z_t, z_{t+1}, z_{t+2})^T$, can yield $z^{t+1}=Mz^t$. Thus, $MB=B\Lambda$, so $M^{18}B=B\Lambda^{18}=B$ and $M^{18}=I$, rendering substantially all sequences periodic with a period of 18.

To encode a beacon code sequence according to the scheme, the first three beacon symbol positions can be chosen arbitrarily as:

$$\alpha_1 \in \{0,1\}, \alpha_2 \in \{0,1,\ldots,35\}, \alpha_3 \in \{0,1,\ldots,35\},$$

representing $2*36^2$ sequences. Then, a can denote $(\alpha_1, \alpha_2, \alpha_3)^T$. The first 3 elements in the beacon sequence can be given by $B \exp[V\alpha]$ where the square brackets can indicate that exp should be applied component-wise and $V\alpha$ is computed modulo 36. Now the following equation should be solvable:

$$M^k(B\exp[V\alpha])=B\exp[V(\alpha+k(2,0,0)^T)]$$

where arithmetic inside the square brackets is modulo 36 and outside is modulo 37, for example. Thus, multiplying $M^k$ is substantially equivalent to adding $k(2, 0, 0)^T$ to α modulo 36. The decoding algorithm can be given as follows.

Observing $y=M^k z$, where $z=B\exp[V\alpha]$, $$(\alpha+k(2,0,0)^T)=V^{-1}\log[B^{-1}y]$$

where arithmetic is modulo 36 except for $B^{-1}y$ which is modulo 37. In particular, the observation in the B basis can be expressed as $w=B^{-1}y \pmod{37}$. Then the logarithm in the V basis can be expressed as $\beta=V^{-1}\log[w] \pmod{36}$ where $\beta=(\beta_1, \beta_2, \beta_3)^T$. Then using "C" notation:

$$\alpha_1=\beta_1 \% 2$$

$$\alpha_2=\beta_2$$

$$\alpha_3=\beta_3$$

$$k=\beta_1/2 \bmod 18$$

Thus, the three consecutive beacon symbols received can uniquely determine the sequence and the time shift k modulo 18.

Additionally, frequency offsets can be discerned by decoding 4 beacon symbols in this example. If the tones are shifted in frequency by s according to a mobile device, for example, then 4 beacon symbols can be observed as $z_i+s$. In this regard, then, $y_4-(ay_1+by_2+cy_3)=(1-a-b-c)s$, from which s can be determined and a mobile device or other receiver of beacon symbols can be adjusted accordingly. Moreover, colliding beacon symbols can be disambiguated after receiving a number of signals. Two colliding can be disambiguated with high probability after receiving 4 symbols (and more definitely with 5), and three colliding beacons after 10 symbols. For example, the condition $y_4-(ay_1+by_2+cy_3)=0$ can be satisfied for substantially any valid beacon sequence, which can be used in this regard to resolve the colliding symbols. With $(p_1, p_2, p_3)=(3, 14, 35)$, substantially any 3 out of 8 consecutive beacon symbols in this example can determine the sequence. Many 3 out of the 18 can be used to determine the beacon code as well; the interpolating function is linear over Z/37 and can be easily obtained from the fundamental linear constraint over 4 consecutive beacon locations, for example.

According to another example, a maximum distance separable (MDS) code to transmit beacon symbols forming a beacon. MDS codes can generate codewords having the largest possible minimum difference between the codewords, and thus can provide the most error correcting capability for a given amount of redundancy, for example. The MDS code can be formulated, in one example, by evaluating at least one of the length of the beacon message (e.g. in bits), the number of subcarriers available to transmit the beacon, the amount of redundancy desired for the beacon message, the length of the sequence of non-binary symbols, and/or additional similar factors.

According to an example, which will be referred to hereinafter as "beacon code A," 211 subcarriers can be available for transmitting beacon symbols (e.g. n=211 at 402) where the beacon symbol can be a 12-bit message (including data as described previously); thus, the MDS code can be required to support at least 2^12=4096 different sequences of non-binary symbols (which is what the sector transmits, for instance). According to this example, the beacon symbols can be transmitted on a subcarrier with an index $X_t(\alpha_1,\alpha_2)$, which can be expressed as:

$$X_t(\alpha_1,\alpha_2)=p_1^{\alpha_1+21t}\oplus p_2^{\alpha_2+\alpha_1+21t},$$

where $p_1$ and $p_2$ can be primitive elements of field $Z_{211}$ (which can comprise 211 elements representing the subcarriers), $\alpha_1$ and $\alpha_2$ can be exponent factors determined based at least in part on the beacon message (as described infra), and $\oplus$ denotes modulo addition. In this example, $p_1$ and $p_2$ can represent elements of $Z_{211}$ that can generate substantially all 211 non-zero elements of the field. In a more trivial example, $Z_7$ can have 5 as a primitive element as 5 can used to generate all 6 non-zero elements ($5^0$ mod 7=1, $5^1$ mod 7=5, $5^2$ mod 7=4, $5^3$ mod 7=6, $5^4$ mod 7=2, and $5^5$ mod 7=3).

Arithmetic operations in the above equation can be over the field $Z_{211}$; thus addition of A and B can be given as (A+B) mod 211, A raised the B power can be given as $A^B$ mod 211, etc., but the addition of integers within the exponents can be modulo-210 integer additions. The exponent factors $\alpha_1$ and $\alpha_2$ can be defined as:

$$0 \leq \alpha_1 < 21, \text{ and}$$

$$0 \leq \alpha_2 < 210.$$

Thus, a total of 21*210=4410 disparate combinations of $\alpha_1$ and $\alpha_2$ can be defined by the equation; this can support the 12-bit message having 4096 available sequences, for example. Additionally, each unique combination of $\alpha_1$ and $\alpha_2$ can correspond to a different message (and thus a different sequence of non-binary symbols for the beacon) in this regard. In an example, a message can be mapped to the available symbols in substantially any manner including randomly, static assignment via network planning or configuration, historical based, and the like. According to one example, for a given combination of $\alpha_1$ and $\alpha_2$, the message, M, can be mapped to $M=210*\alpha_1+\alpha_2$, for example. Because $p_i^{210}=1$, for i=1, 2, the code of the aforementioned equation can be periodic with a period of 210/21=10 symbols; thus, $X(\alpha_1,\alpha_2)=X_{t+10}(\alpha_1,\alpha_2)$ for a given value of t, in one example. The beacon symbols can be shifted according subcarrier in this way to convey information to a receiver, for example.

According to an example, a mobile device can recover a message sent in a beacon with two beacon symbols of the message in the presence of a sector even without having time information. This can be accomplished, for example, by receiving the non-binary symbols, $x_1$ and $x_2$ at times t and t+1. The symbols can be expressed as:

$$x_1 = p_1^{\alpha_1+21t} \oplus p_2^{\alpha_2+\alpha_1+21t}, \text{ and}$$

$$x_2 = p_1^{\alpha_1+21(t+1)} \oplus p_2^{\alpha_2+\alpha_1+21(t+1)} = p_1^{21} * p_1^{\alpha_1+21t} \oplus p_2^{21} * p_2^{\alpha_2+\alpha_1+21t}.$$

or in matrix form:

$$\begin{pmatrix} x_1 \\ x_2 \end{pmatrix} = \begin{pmatrix} 1 & 1 \\ p_1^{21} & p_2^{21} \end{pmatrix} \begin{pmatrix} p_1^{\alpha_1+21t} \\ p_2^{\alpha_2+\alpha_1+21t} \end{pmatrix} = A \begin{pmatrix} p_1^{\alpha_1+21t} \\ p_2^{\alpha_2+\alpha_1+21t} \end{pmatrix},$$

where $$A = \begin{pmatrix} 1 & 1 \\ p_1^{21} & p_2^{21} \end{pmatrix},$$

and $p_1^{21}$ and $p_2^{21}$ are equal to two specific elements of field $Z_{211}$. Using these equations, the mobile device or terminal can solve for $p_1^{\alpha_1+21t}$ and $p_2^{\alpha_2+\alpha_1+21t}$ as follows:

$$\begin{pmatrix} y_1 \\ y_2 \end{pmatrix} = A^{-1} \begin{pmatrix} x_1 \\ x_2 \end{pmatrix} = \begin{pmatrix} p_1^{\alpha_1+21t} \\ p_2^{\alpha_2+\alpha_1+21t} \end{pmatrix}.$$

Following this, the terminal or mobile device can obtain exponents of $p_1^{\alpha_1+21t}$ and $p_2^{\alpha_2+\alpha_1+21t}$ as follows:

$$z_1 = \log(y_1)/\log(p_1) = (\alpha_1 + 21t) \bmod 210, \text{ and}$$

$$z_2 = \log(y_2)/\log(p_2) = (\alpha_2 + \alpha_1 + 16t) \bmod 210.$$

The logarithm can be defined with respect to substantially any primitive element of the field $Z_{211}$, and a given value of y can map to a specific value of z. Accordingly, a look-up table can be implemented within the device or terminal, for example. The exponent factors $\alpha_1$ and $\alpha_2$ and time index t can be obtained as follows:

$$\alpha_2 = z_2 - z_1,$$

$$\alpha_1 = z_1 \bmod 21, \text{ and}$$

$$t = z_1 \text{ div } 21.$$

Factor $\alpha_2$ can be obtained by combing the two logarithm equations above. Since $\alpha_1 < 21$ (as shown above), $\alpha_1$ can be the integer remainder of $z_1/21$, and time index t can be the quotient of $z_1/21$.

In this regard, the terminal can also recover a message sent in the beacon with two non-consecutive beacon symbols that are not 10 symbols apart in the presence of one sector. In one example, the terminal can receive two beacons symbols and obtain two non-binary symbols $x_1$ and $x_2$ at times t and t+$\Delta$, where $\Delta$ is not an integer multiple of 10. The received symbols can be expressed as:

$$x_1 = p_1^{\alpha_1+21t} \oplus p_2^{\alpha_2+\alpha_1+21t}, \text{ and}$$

$$x_2 = p_1^{\alpha_1+21(t+\Delta)} \oplus p_2^{\alpha_2+\alpha_1+21(t+\Delta)} = p_1^{21} * p_1^{\alpha_1+21t} \oplus p_2^{21} * p_2^{\alpha_2+\alpha_1+21t}.$$

or in matrix form:

$$\begin{pmatrix} x_1 \\ x_2 \end{pmatrix} = \begin{pmatrix} 1 & 1 \\ p_1^{21\Delta} & p_2^{21\Delta} \end{pmatrix} \begin{pmatrix} p_1^{\alpha_1+21t} \\ p_2^{\alpha_2+\alpha_1+21t} \end{pmatrix} = A \begin{pmatrix} p_1^{\alpha_1+21t} \\ p_2^{\alpha_2+\alpha_1+21t} \end{pmatrix},$$

where $$A = \begin{pmatrix} 1 & 1 \\ p_1^{21\Delta} & p_2^{21\Delta} \end{pmatrix}.$$

Thus, the matrix A can be dependent on beacon symbols received by the terminal or mobile device, for example. It is to be appreciated that the terminal can decode the received non-binary symbols in the manner described above with a different matrix A as well.

Additionally, as mentioned previously, the terminal can decode colliding beacon symbols as well to associate the beacons with their transmitter to determine information about the transmitter and the beacon. For example, three non-binary symbols can be received for sector A ($xa_1$, $xa_2$, $xa_3$) and for sector B ($xb_1$, $xb_2$, $xb_3$). Based on the first two symbols, the terminal or receiving device can solve using four combinations ($xa_1$, $xa_2$), ($xb_1$, $xb_2$), ($xa_1$, $xb_2$), and ($xb_2$, $xa_1$) for four possible messages. For each of the four possible messages, the terminal knows what to expect of the third symbol. For example, two of the messages ($xa_1$, $xa_2$) and ($xb_1$, $xb_2$) can be verified by $xa_3$ and $xb_3$ respectively. The other two, ($xa_1$, $xb_2$) and ($xb_2$, $xa_1$) cannot be verified in this example. Also, as shown, the beacon code can be the sum of the two exponential terms $p_1^{\alpha_1+21t}$ and $p_2^{\alpha_2+\alpha_1+21t}$ formed with two primitive elements, and time index t is placed in these exponents as well. Factors $\alpha_1$ and $\alpha_2$ can also be in the exponents or coefficients thereof. Such a beacon code can be decodable upon receiving 2 symbols for example, and can be used for greater than 412 subcarriers per symbol period usable for transmitting beacon symbols, in one example. It is to be appreciated that beacon code A, as described, can be implemented for substantially any number of subcarriers; another example can use 257 subcarriers with a period of 16 to create 16*256=4096 combinations for a 12-bit message. Additionally, different message sizes can be utilized as well; 12-bit is just one of a limitless number of examples.

According to another example using a Reed-Solomon code, which will be referred to hereinafter as "beacon code A'," 211 subcarriers can be available for transmitting beacon symbols (e.g. n=211 at 402) where the beacon symbol can be a 12-bit message (including data as described previously); thus, the Reed-Solomon code can be required to support at least 2^12=4096 different sequences of non-binary symbols (which is what the sector transmits, for instance). According to this example, the beacon symbols can be transmitted on a subcarrier with an index $X_t(\alpha_1,\alpha_2)$, which can be expressed as:

$$X_t(\alpha_1,\alpha_2)=p_1^{\alpha_1+21t} \oplus p_1^{\alpha_2} p_2^{21t},$$

where $p_1$ can be a primitive element of field $Z_{211}$ (which can comprise 211 elements representing the subcarriers) and $p_2=p_1^2$, $\alpha_1$ and $\alpha_2$ can be exponent factors determined based at least in part on the beacon message (as described infra), and $\oplus$ denotes modulo addition. In this example, $p_1=207$ and $p_2=p_1^2=16$. Other primitive elements can be used for $p_1$ in other examples. A larger primitive element can provide more frequency diversity since a small value of $p_1$ can imply that $p_1^{q\square t}$ and $p_1^{q\square(t+1)}$ are close together. The selection of $p_2=p_1^2$ can result in the Reed-Solomon code, which can be characterized by a weighted sum of increasing exponentials.

The exponent factors $\alpha_1$ and $\alpha_2$ can be defined as:

$0 \leq \alpha_1 < 21$, and $0 \leq \alpha_2 < 210$.

Thus, a total of 21*210=4410 disparate combinations of $\alpha_1$ and $\alpha_2$ can be defined by the equation; this can support the 12-bit message having 4096 available sequences, for example. Additionally, each unique combination of $\alpha_1$ and $\alpha_2$ can correspond to a different message (and thus a different sequence of non-binary symbols for the beacon) in this regard. In an example, a message can be mapped to the available symbols in substantially any manner including randomly, static assignment via network planning or configuration, historical based, and the like. According to one example, for a given combination of $\alpha_1$ and $\alpha_2$, the message, M, can be mapped to $M=210*\alpha_1+\alpha_2$, for example. Because $p_i^{210}=1$, for i=1, 2, the code of the aforementioned equation can be periodic with a period of 210/21=10 symbols; thus, $X(\alpha_1,\alpha_2)=X_{t+10}(\alpha_1,\alpha_2)$ for a given value of t, in one example. The beacon symbols can be shifted according to subcarrier in this way to convey information to a receiver, for example.

According to an example, a mobile device can recover a message sent in a beacon with two consecutive beacon symbols in the presence of a sector even without having time information. This can be accomplished, for example, by receiving the non-binary symbols, $x_1$ and $x_2$ at times t and t+1. The symbols can be expressed as:

$$x_1 = p_1^{\alpha_1+21t} \oplus p_1^{\alpha_2} p_2^{21t}, \text{ and}$$

$$x_2 = p_1^{\alpha_1+21(t+1)} \oplus p_1^{\alpha_2} p_2^{21(t+1)} = p_1^{21} p_1^{\alpha_1+21t} \oplus p_2^{21} p_1^{\alpha_2} p_2^{21t}.$$

or in matrix form:

$$\begin{pmatrix} x_1 \\ x_2 \end{pmatrix} = \begin{pmatrix} 1 & 1 \\ p_1^{21} & p_2^{21} \end{pmatrix} \begin{pmatrix} p_1^{\alpha_1+21t} \\ p_1^{\alpha_2} p_2^{21t} \end{pmatrix} = A \begin{pmatrix} p_1^{\alpha_1+21t} \\ p_1^{\alpha_2} p_2^{21t} \end{pmatrix},$$

where $$A = \begin{pmatrix} 1 & 1 \\ p_1^{21} & p_2^{21} \end{pmatrix},$$

and $p_1^{21}$ and $p_2^{21}$ are equal to two specific elements of field $Z_{211}$. Using these equations, the mobile device or terminal can solve for $p_1^{\alpha_1+21t}$ and $p_1^{\alpha_2} p_2^{21t}$ as follows:

$$\begin{pmatrix} y_1 \\ y_2 \end{pmatrix} = A^{-1} \begin{pmatrix} x_1 \\ x_2 \end{pmatrix} = \begin{pmatrix} p_1^{\alpha_1+21t} \\ p_1^{\alpha_2} p_2^{21t} \end{pmatrix}.$$

Following this, the terminal or mobile device can obtain exponent of $p_1^{\alpha_1+21t}$ as follows:

$$z_1 = \log(y_1)/\log(p_1) = (\alpha_1+21t) \bmod 210.$$

The logarithm can be defined with respect to substantially any primitive element of the field $Z_{211}$, and a given value of y can map to a specific value of z. Accordingly, a look-up table can be implemented within the device or terminal, for example. The exponent factor $\alpha_1$ and time index t can be obtained as follows:

$\alpha_1 = z_1 \bmod 21$, and $t = z_1 \div 21$.

Factor $\alpha_2$ can be obtained by substituting derived t into $y_2 = p_1^{\alpha_2} p_2^{21t}$ to obtain $p_1^{\alpha_2}$, for example, and then solving $\alpha_2$ for based on $p_1^{\alpha_2}$.

In this regard, the terminal can also recover a message sent in the beacon with two non-consecutive beacon symbols that are not 10 symbols apart in the presence of one sector, as well as colliding or overlapping beacon symbol sequences from two sectors with three consecutive beacon symbols, as shown supra.

In one example, a Reed-Solomon beacon code A' can encode a quantity M into a sequence of non-binary number in the set $\{0, 1, 2, \ldots, Q-1\}$ where $Q=211$. Position t in the sequence can be given by $X_1(M)=(p_1^{\alpha_1+21t}+p_1^{\alpha_2+42t}) \bmod Q$. In this example, $p_1=207$, $\alpha_1=\lfloor M/(Q-1) \rfloor$, and $\alpha_2=M \bmod(Q-1)$; $p_1$ is a primitive element of $GF(Q)$, therefore, $(p_1^{Q-1} \bmod Q)=1$.

Another example using an MDS code, which will be referred to hereinafter as "beacon code B," can use 47 subcarriers to transmit beacon symbols (e.g. n=47 in the subcarriers for symbol period 402). As in the previous example, a 12-bit beacon code, for example, can require support of 4096 different sequences. To facilitate such, the beacon symbol can be transmitted on a subcarrier with index $X_t(\alpha_1, \alpha_2, \alpha_3)$, which can be expressed as:

$$X_t(\alpha_1,\alpha_2,\alpha_3)=p_1^{\alpha_1+2t} \oplus p_2^{\alpha_2+\alpha_1+2t} \oplus p_3^{\alpha_3+\alpha_1+2t},$$

where $p_1$, $p_2$, and $p_3$ can be primitive elements of field $Z_{47}$ (which can comprise 47 elements representing the subcarriers), $\alpha_1$, $\alpha_2$, and $\alpha_3$ can be exponent factors determined based at least in part on the beacon message (as described infra), and $\oplus$ denotes modulo addition. In this example, the exponent factors $\alpha_1$, $\alpha_2$, and $\alpha_3$ can be defined as:

$$0 \leq \alpha_1 < 2,$$

$$0 \leq \alpha_2 < 46, \text{ and}$$

$$0 \leq \alpha_3 < 46.$$

Thus, a total of $2*46*46=4232$ disparate combinations of $\alpha_1$, $\alpha_2$, and $\alpha_3$ can be defined by the equation, thus, supporting the required 4096 combinations for the beacon symbol. The beacon message can be mapped to a combination in one example as $M=2116*\alpha_1+46*\alpha_2+\alpha_3$. Additional and/or alternative mappings can be used as well as described supra. Because $p_i^{46}=1$, for $i=1, 2, 3$, the code can be periodic with a period of $46/2=23$ symbols, for example; thus, $X_t(\alpha_1, \alpha_2, \alpha_3)=X_{t+23}(\alpha_1, \alpha_2, \alpha_3)$ for a given t.

A terminal or mobile device can recover such a message or beacon code with three beacon symbols of the message, for example. In an example, the device can receive three non-binary symbols $x_1$, $x_2$, and $x_3$ at times t, t+1, and t+2, respectively. The binary symbols can be expressed as:

$$x_1 = p_1^{\alpha_1+2t} \oplus p_2^{\alpha_2+\alpha_1+2t} \oplus p_3^{\alpha_3+\alpha_1+2t},$$

$$x_2 = p_1^{\alpha_1+2(t+1)} \oplus p_2^{\alpha_2+\alpha_1+2(t+1)} \oplus p_3^{\alpha_3+\alpha_1+2(t+1)}$$
$$= p_1^2 * p_1^{\alpha_1+2t} \oplus p_2^2 * p_2^{\alpha_2+\alpha_1+2t} \oplus p_3^2 * p_3^{\alpha_2+\alpha_1+2t}, \text{ and}$$

$$x_3 = p_1^{\alpha_1+2(t+2)} \oplus p_2^{\alpha_2+\alpha_1+2(t+2)} \oplus p_3^{\alpha_3+\alpha_1+2(t+2)}$$
$$= p_1^4 * p_1^{\alpha_1+2t} \oplus p_2^4 * p_2^{\alpha_2+\alpha_1+2t} \oplus p_3^4 * p_3^{\alpha_2+\alpha_1+2t}$$

or in matrix form:

$$\begin{pmatrix} x_1 \\ x_2 \\ x_3 \end{pmatrix} = \begin{pmatrix} 1 & 1 & 1 \\ p_1^2 & p_2^2 & p_3^2 \\ p_1^4 & p_2^4 & p_3^4 \end{pmatrix} \begin{pmatrix} p_1^{\alpha_1+2t} \\ p_2^{\alpha_2+\alpha_1+2t} \\ p_3^{\alpha_3+\alpha_1+2t} \end{pmatrix} = \underline{B} \begin{pmatrix} p_1^{\alpha_1+2t} \\ p_2^{\alpha_2+\alpha_1+2t} \\ p_3^{\alpha_3+\alpha_1+2t} \end{pmatrix},$$

where $$\underline{B} = \begin{pmatrix} 1 & 1 & 1 \\ p_1^2 & p_2^2 & p_3^2 \\ p_1^4 & p_2^4 & p_3^4 \end{pmatrix},$$

and the elements of B are elements of the field $Z_{47}$. Using these equations, the mobile device or terminal can solve for $p_1^{\alpha_1+2t}$, $p_2^{\alpha_2\alpha_1+2t}$, and $p_3^{\alpha_3\alpha_1+2t}$ as follows:

$$\begin{pmatrix} y_1 \\ y_2 \\ y_3 \end{pmatrix} = \underline{B}^{-1} \begin{pmatrix} x_1 \\ x_2 \\ x_3 \end{pmatrix} = \begin{pmatrix} p_1^{\alpha_1+2t} \\ p_2^{\alpha_2+\alpha_1+2t} \\ p_3^{\alpha_3+\alpha_1+2t} \end{pmatrix}.$$

Following this, the terminal or mobile device can obtain exponents of $p_1^{\alpha_1+2t}$, $p_2^{\alpha_2\alpha_1+2t}$, and $p_3^{\alpha_3\alpha_1+2t}$ as follows:

$$z_1 = \log(y_1)/\log(p_1) = \alpha_1+2t,$$

$$z_2 = \log(y_2)/\log(p_2) = \alpha_2+\alpha_1+2t, \text{ and}$$

$$z_3 = \log(y_3)/\log(p_3) = \alpha_3+\alpha_1+2t.$$

The logarithm can be defined with respect to substantially any primitive element of the field $Z_{47}$, and a given value of y can map to a specific value of z. Accordingly, a look-up table can be implemented within the device or terminal, for example. The exponent factors $\alpha_1$, $\alpha_2$, and $\alpha_3$ and time index t can be obtained as follows:

$$\alpha_2 = z_2 - z_1,$$

$$\alpha_3 = z_3 - z_1,$$

$$\alpha_1 = z_1 \bmod 2, \text{ and}$$

$$t = z_1 \text{ div } 2.$$

Similarly, as shown in the previous example, the terminal can recover messages sent in the beacon with three consecutive symbols in the presence of a sector. The terminal can also recover messages sent in two sectors with five consecutive signals as shown above. This example code can be used where the number of subcarriers of a symbol period 402, 406, or 410 usable for transmitting beacon symbols is less than 412, in one example.

Another example using an MDS code, which will be referred to hereinafter as "beacon code B'," can be a Reed-Solomon code designed using 47 subcarriers to transmit beacon symbols (e.g. n=47 in the subcarriers for symbol period 402). As in the previous example, a 12-bit beacon code, for example, can require support of 4096 different sequences. To facilitate such, the beacon symbol can be transmitted on a subcarrier with index $X_t(\alpha_1, \alpha_2, \alpha_3)$, which can be expressed as:

$$X_t(\alpha_1,\alpha_2,\alpha_3)=p_1^{\alpha_1+2t} \oplus p_1^{\alpha_2} p_2^{2t} \oplus p_1^{\alpha_3} p_3^{2t},$$

where $p_1$ can be a primitive element of field $Z_{47}$ (which can comprise 47 elements representing the subcarriers), $p_2=p_1^2$, $p_3=p_1^3$, and $\alpha_1$, $\alpha_2$, and $\alpha_3$ can be exponent factors determined based at least in part on the beacon message (as described herein). In this example, arithmetic operations can be over the field $Z_{47}$, and in one example, $p_1=45$, $p_2=p_1^2=4$, and $p_3=p_1^3=39$; other primitive elements can be used for $p_1$ as well. The selection $p_2=p_1^2$ and $p_3=p_1^3$ results in a Reed- Solomon code in the above equation, for example. Additionally, $\alpha_1$, $\alpha_2$, and $\alpha_3$ can be defined as:

$$0 \leq \alpha_1 < 2,$$

$$0 \leq \alpha_2 < 46, \text{ and}$$

$$0 \leq \alpha_3 < 46.$$

More than 4096 disparate combinations of $\alpha_1$, $\alpha_2$, and $\alpha_3$ can be defined by the equation. Because $p_i^{46}=1$, for $i=1, 2, 3$, the code can be periodic with a period of 46/2=23 symbols, for example; thus, $X_t(\alpha_1, \alpha_2, \alpha_3) = X_{t+23}(\alpha_1, \alpha_2, \alpha_3)$ for a given t.

A terminal or mobile device can recover such a message or beacon code with three beacon symbols of the message, for example. In an example, the device can receive three non-binary symbols $x_1$, $x_2$, and $x_3$ at times t, t+1, and t+2, respectively. The binary symbols can be expressed as:

$$x_1 = p_1^{\alpha_1+2t} \oplus p_1^{\alpha_2} p_2^{2t} \oplus p_1^{\alpha_3} p_3^{2t},$$

$$x_2 = p_1^{\alpha_1+2(t+1)} \oplus p_1^{\alpha_2} p_2^{2(t+1)} \oplus p_1^{\alpha_3} p_3^{2(t+1)}$$
$$= p_1^2 p_1^{\alpha_1+2t} \oplus p_2^2 p_1^{\alpha_2} p_2^{2t} \oplus p_3^2 p_1^{\alpha_3} p_3^{2t}, \text{ and}$$

$$x_3 = p_1^{\alpha_1+2(t+2)} \oplus p_1^{\alpha_2} p_2^{2(t+2)} \oplus p_1^{\alpha_3} p_3^{2(t+2)}$$
$$= p_1^4 p_1^{\alpha_1+2t} \oplus p_2^4 p_1^{\alpha_2} p_2^{2t} \oplus p_3^4 p_1^{\alpha_3} p_3^{2t}$$

or in matrix form:

$$\begin{pmatrix} x_1 \\ x_2 \\ x_3 \end{pmatrix} = \begin{pmatrix} 1 & 1 & 1 \\ p_1^2 & p_2^2 & p_3^2 \\ p_1^4 & p_2^4 & p_3^4 \end{pmatrix} \begin{pmatrix} p_1^{\alpha_1+2t} \\ p_1^{\alpha_2} p_2^{2t} \\ p_1^{\alpha_3} p_3^{2t} \end{pmatrix} = \underline{B} \begin{pmatrix} p_1^{\alpha_1+2t} \\ p_1^{\alpha_2} p_2^{2t} \\ p_1^{\alpha_3} p_3^{2t} \end{pmatrix},$$

where $$\underline{B} = \begin{pmatrix} 1 & 1 & 1 \\ p_1^2 & p_2^2 & p_3^2 \\ p_1^4 & p_2^4 & p_3^4 \end{pmatrix},$$

and the elements of B are elements of the field $Z_{47}$. Using these equations, the mobile device or terminal can solve for $p_1^{\alpha_1+2t}$, $p_1^{\alpha_2} p_2^{2t}$, and $p_1^{\alpha_3} p_3^{2t}$ as follows:

$$\begin{pmatrix} y_1 \\ y_2 \\ y_3 \end{pmatrix} = \underline{B}^{-1} \begin{pmatrix} x_1 \\ x_2 \\ x_3 \end{pmatrix} = \begin{pmatrix} p_1^{\alpha_1+2t} \\ p_1^{\alpha_2} p_2^{2t} \\ p_1^{\alpha_3} p_3^{2t} \end{pmatrix}.$$

Following this, the terminal or mobile device can obtain exponent of $p_1^{\alpha_1+2t}$ as follows:

$$z_1 = \log(y_1)/\log(p_1) = \alpha_1 + 2t.$$

The logarithm can be defined with respect to substantially any primitive element of the field $Z_{47}$, and a given value of y can map to a specific value of z. Accordingly, a look-up table can be implemented within the device or terminal, for example. The exponent factor $\alpha_1$ and time index t can be obtained as follows:

$$\alpha_1 = z_1 \bmod 2, \text{ and}$$

$$t = z_1 \text{ div } 2.$$

Factor $\alpha_2$ can be determined by substituting t obtained as above into $y_2 = p_1^{\alpha_2} p_2^{2t}$ to obtain $p_1^{\alpha_2}$, and then solving for $\alpha_2$ based on $p_1^{\alpha_2}$. Similarly, factor $\alpha_3$ can be determined by substituting t obtained as above into $y_3 = p_1^{\alpha_3} p_3^{2t}$ to obtain $p_1^{\alpha_3}$, and then solving for $\alpha_3$ based on $p_1^{\alpha_3}$. Moreover, as shown in the previous example, the terminal can recover messages sent in the beacon with three consecutive symbols in the presence of a sector. The terminal can also recover messages sent in two sectors with five consecutive signals as shown above. This example code can be used where the number of subcarriers of a symbol period 402, 406, or 410 that are useable for transmitting beacon symbols is less than 412, for example.

In one example, a Reed-Solomon beacon code B' can encode a quantity M into a sequence of non-binary number in the set $\{0, 1, 2, \ldots, Q-1\}$ where Q=47. Position t in the sequence can be given $X_t(M) = (p_1^{\alpha_1+2t} + p_1^{\alpha_2+4t} + p_1^{\alpha_3+6t}) \bmod Q$. Here, $p_1=45$, $\alpha_1 = \lfloor M/(Q-1)^2 \rfloor$, $\alpha_2 = \lfloor M/(Q-1) \rfloor \bmod(Q-1)$, and $\alpha_3 = M \bmod(Q-1)$; $p_1$ is a primitive element of GF(Q), therefore, $(p_1^{Q-1} \bmod Q) = 1$.

As shown in the formula $X_t(\alpha_1, \alpha_2, \alpha_3) = p_1^{\alpha_1+2t} \oplus p_2^{\alpha_2+\alpha_1+2t} \oplus p_3^{\alpha_3+\alpha_1+2t}$, the beacon code can be a polynomial function having three terms $p_1^{\alpha_1+2t}$, $p_2^{\alpha_2+\alpha_1+2t}$, and $p_3^{\alpha_3+\alpha_1+2t}$, formed with three primitive elements. In a general example, a polynomial code can be designed such that a terminal can decode the beacon based on R beacon symbols, where $R \geq 1$. For a beacon symbol with time index t transmitted on a subcarrier with index $X_t(\alpha_1, \ldots, \alpha_R)$, which can be expressed as:

$$X_t(\alpha_1, \ldots, \alpha_R) = p_1^{\alpha_1+qt} \oplus p_2^{\alpha_2+\alpha_1+qt} \oplus \ldots \oplus p_R^{\alpha_1+\ldots+\alpha_R+qt},$$

where $p_1$ through $p_R$ can be primitive elements of field $Z_S$, $\alpha_1$ through $\alpha_R$ can be exponent factors determined based at least in part on the beacon message (as described herein), S is the number of subcarriers used to transmit the beacon (or the total number available to transmit the beacon symbols), q is a parameter determined based on the length of the polynomial code and S, and $\oplus$ denotes modulo addition. Also, $$X_t(\alpha_1, \ldots, \alpha_R) = p_1^{\beta_{11}\alpha_1+qt} \oplus p_2^{\beta_{21}\alpha_2+\alpha_1+qt} \oplus \ldots \oplus p_R^{\beta_{R1}\alpha_1+\ldots+\alpha_R+qt},$$

where $\beta_{ij}$ can be 0 or 1.

The field $Z_S$ can include S elements from 0 through S−1, where $S \geq 1$. Thus, operations in the foregoing equations of this example can be over the field $Z_S$, as described above, such that they are all modulo S. R and S can be selected based at least in part on $$\frac{(S-1)^R}{L} \geq M,$$

where M is the number of messages supported by the polynomial code, for example, and L is the length of the polynomial code. Codes using this format can have the following properties: codes can have a period of L symbols so that $X_t(\alpha_1, \ldots, \alpha_R) = X_{t+L}(\alpha_1, \ldots, \alpha_R)$, up to L−1 sectors can be resolved deterministically if $$\frac{(S-1)^R}{L} \geq M,$$

is satisfied, and L can be the number of cyclic shifts of a codeword that decodes to the same message.

Parameter q can be described as $$q = \frac{S-1}{L},$$

and the exponent factors can be defined as:

$0 \leq \alpha_1 < q$, and $0 \leq \alpha_2, \ldots, \alpha_R < (S-1)$.

A total of $q*(S-1)^{R-1}$ different combinations of $\alpha_1$ through $\alpha_R$ can be obtained with the constraints shown above. Each unique combination of $\alpha_1$ through $\alpha_R$ can correspond to a different message and hence a different sequence of non-binary symbols for the beacon. A message can be mapped to a corresponding combination of $\alpha_1$ through $\alpha_R$ as follows:

$m = (S-1)^{R-1} * \alpha_1 + \ldots + (S-1) * \alpha_{R-1} + \alpha_R.$

It is to be appreciated that other mappings between a message and a combination of $\alpha_1$ through $\alpha_R$ can also be used.

In general, a Reed-Solomon code can be designed such that a terminal can decode the beacon based on R beacon symbols, where $R \geq 1$. For a Reed-Solomon beacon code symbol with time index t transmitted on a subcarrier with index $X_t(\alpha_1, \ldots, \alpha_R)$, which can be expressed as:

$$X_t(\alpha_1, \ldots, \alpha_R) = p_1^{\alpha_1 + qt} \oplus p_1^{\alpha_2} p_2^{qt} \oplus p_1^{\alpha_3} p_3^{qt} \oplus \ldots \oplus p_1^{\alpha_R} p_R^{qt},$$

where $p_1$ can be a primitive element of field $Z_S$ and $p_m = p_1^m$ for $m = 2, \ldots, R$, $\alpha_1$ through $\alpha_R$ can be exponent factors determined based at least in part on the beacon message, S can be the number of subcarriers used to transmit the beacon, and q can be a parameter determined based on the length of the beacon code and S as described previously.

As shown, an beacon code can have an MDS property that has the ability to decode a message based on a minimum number of received beacon symbols, for example. If S subcarriers are available for transmitting beacons, then $S^2$ different messages can be sent utilizing two symbol periods. In this regard, a beacon subcarrier can be interpreted as an element of the non-binary alphabet $Z_S = \{0, 1, \ldots, S-1\}$. The beacon sequence can also be interpreted as an (n,k) block code over $Z_S$, where k=2 and n=L.

A beacon code can be designed to have a cyclic-shift invariant property as well, such that the cyclic shifts of the codeword can be decoded to the same message, for example. This property can be desired for asynchronous sectors that can transmit beacon symbols at the same time. In this example, using one or more of the coding schemes presented above, $M = S^2/L$ messages can be supported if L cyclic shifts of a codeword are decoded to the same message. For a given value of L, the smallest value for S can be selected such that the desired number of messages M are supported, and L can be selected based in part on a tradeoff between the number of subcarriers S and diversity, for example. Longer L can result from more subcarriers in a given M, and smaller L can result in lower diversity, which can correspond to a reduced ability to disambiguate beacon sequences from different sectors in the presence of collisions.

Beacon codes can also be designed to facilitate detecting different sectors transmitting beacons at the same time, which can be referred to as disambiguation. A terminal can receive beacon codewords from Q sectors at the same time where Q>1, for example. Sequences from sector 1, for example, can be denoted as $x_1(0), x_1(1), \ldots$, the sequence from sector 2 can be $x_2(0), x_2(1), \ldots$, and so on where the sequence from sector Q can be denoted $x_Q(0), x_Q(1), \ldots$. The beacon code can be such that the terminal does not obtain a decoded sequence in the form $\{x_{S1}(0), x_{S2}(1), x_{S3}(2), \ldots\}$, where S1, S2, and S3 are different sectors, for instance. Using beacon code A, defined supra, beacon sequences from Q different sectors can be disambiguated with Q+1 beacon symbols, where $Q \leq L$, in one example. Thus, up to 9 sectors can be disambiguated where the beacon code length, L=10. Using beacon code B, beacons from Q sectors can be disambiguated with 2Q+1 beacon symbols, where $(2Q+1) \leq L$. In this regard, up to 11 sectors can be disambiguated where L=23.

It is to be appreciated that other MDS schemes can be utilized as well, such as for example a purged MDS code designed such that a terminal or device can decode a beacon based only on one beacon symbol. It is to be appreciated that beacon codes can be selected according to many factors, such as those mentioned herein including network planning, derived information regarding other sectors or beacons, as well as, based on beacon message length, number of available carriers, desired performance (e.g. signal-to-noise ratio), etc.

Figure 5:
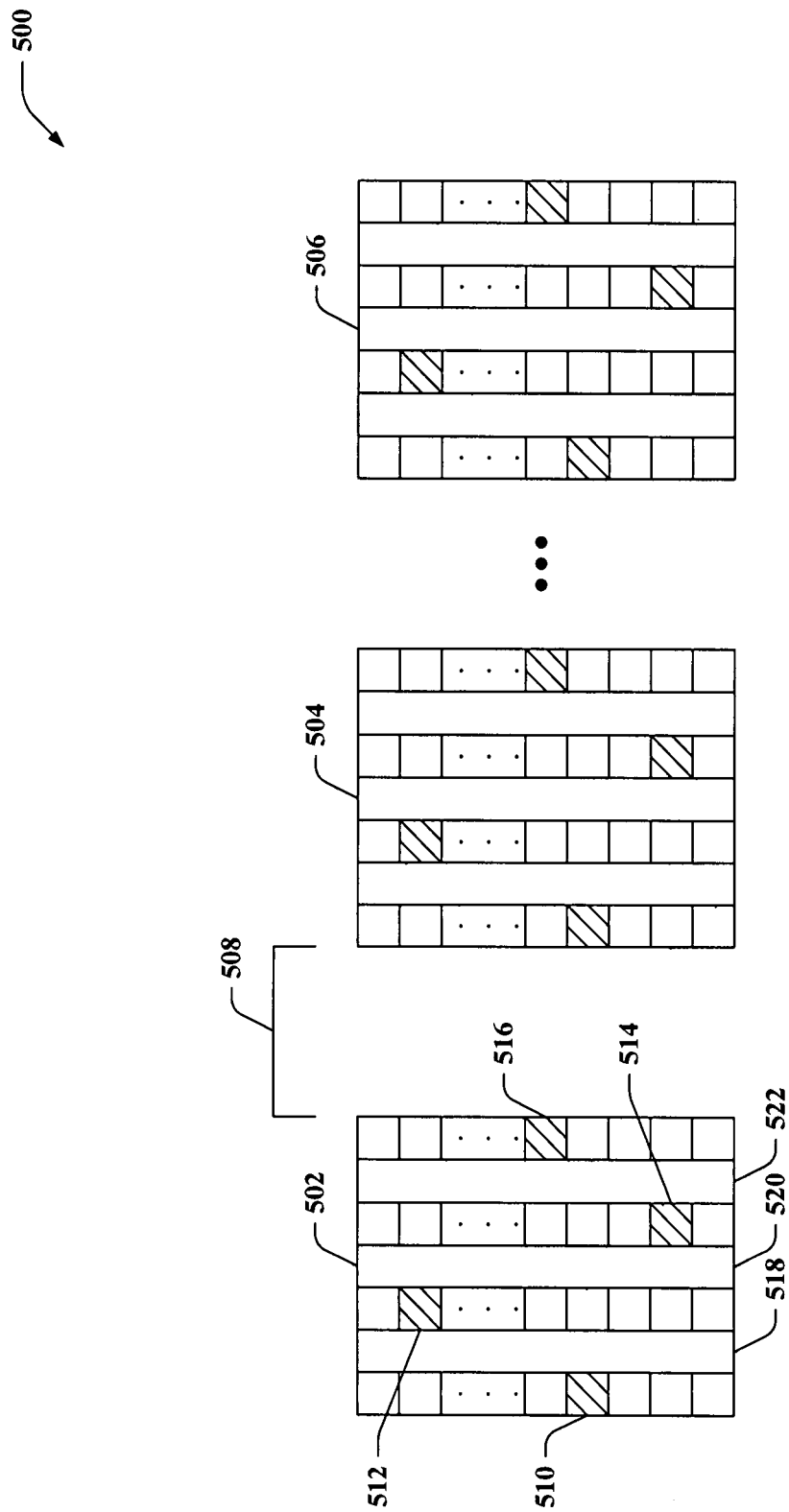
FIG. 5 is an illustration of example clustered beacon symbol periods utilized with respect to synch metrics in wireless communications systems.

Referring to FIG. 5, a representation of bandwidth over a period of time 500 is shown. The bandwidth can have a number of symbol clusters 502, 504, and 506 that facilitate synch metric beacon signaling. The clusters 502, 504, and 506 can represent periods of time on a bandwidth where beacon symbols are transmitted. As shown, the clusters are transmitted together with periods of time in between 508. The period of time can be consistent or different throughout time. For this example, the time period between cluster transmission 508 can be 1 second. Additionally, the cluster can be part of a repeating synch cycle. For example, the shown clusters can represent one cycle where 502 is the first cluster to transmit, 504 is the second, and 506 can be the nth cluster in an n cluster cycle.

In one example, each cluster 502 (as well as 504 and 506, though not represented by reference numerals) can comprise four beacon symbols, 510, 512, 514, and 516 in cluster 502, and 3 low power spectrum density (PSD) OFDM symbols (such as pseudo-random noise (PN) sequences) 518, 520, and 522 between the beacon symbols to separate the high PSD beacons. In this example, the synch cycle can comprise 16 clusters, such that 502 is cluster 1, 504 is cluster 2, and 506 represents cluster 16, for example. In one example, the frequency spectrum can be 20 MHz such that 4 carriers can be utilized having 2048 tones or subcarriers; additionally, the beacon can be sent on 257 specified tones with certain spacing. The synch cycle can be used to send a 22-bit synch metric, which can be divided into three bytes, $X_1, X_2, X_3$. 4 bits in $X_1$ can be used with a (64,3) code in a Galios Field (GF) of 257 elements to encode the three bytes, which can increase reliability of information transmission, combat various types of ambiguities, and essentially embody the properties as described supra.

According to an example of the above configuration, Reed-Solomon codes can be used to encode the beacons in the GF(257) field since the codeword length 64 divides 257−1=256. To map the beacon message to a codeword, a primitive number p in the GF(257) can be chosen and set $w = p^4$, since, w can be checked to determine if it is of order 64 by solving $w^{64} = 1$ in GF(257). In the Galios Fourier Transform (GFT) domain, components thereof can be denoted by $\{C_i\}_{i=0, \ldots, 63}$, and synch metric information $p^{x1}, p^{x2}, p^{x3}$ can be put in $C_1, C_2$, and $C_3$, and the other bytes can be all zeros, for example. Subsequently, the components of the GFT domain can be transformed into codeword $\{C_i\}_{i=0, \ldots, 63}$ via Galois Fourier Transform:

$$c_i = \frac{1}{64} \sum_{j=0}^{63} w^{-ij} C_j.$$

The produced codeword can subsequently be mapped to tones using substantially any mapping procedure such that a receiving device can de-map the tones to produce the codeword, for example. One possible scheme is linear mapping, such that $t_i = t_0 + c_i T$, where $t_i$ is the tone on which the i-th beacon is transmitted and T−1 is the spacing between legal tones, for instance.

Utilizing such codes can attain the desired beacon code properties defined herein; efficient decoding, resolving frequency and/or time shift, resolving colliding symbols, etc. For example, an (n,k) Reed-Solomon code (e.g. a Reed-Solomon code that has n−k consecutive zeros in the GFT domain), can have an MDS in which the minimum distance $d_{min} = n-k+1$, or equivalently, non-zeros codewords have no more than k−1 zeros. Then, if k or more consecutive coded symbols are shared by at least two codewords, $\vec{c}_1$ and $\vec{c}_2$, then $\vec{c}_1 - \vec{c}_2$, which can also be a codeword due to the linearity of Reed-Solomon codes, can have more than k−1 zeros and contradicts the MDS property. Thus, whenever k or more consecutive coded symbols are observed, the correct codeword can be obtained if the symbols are correctly detected. In the synch metric case, the receiver, in this regard, can decode the message if one cluster is received satisfying the efficient decodable property.

Moreover, multiple access point (or base station) ambiguity can also be resolved. For example, if (k−1)M+1 consecutive encoded symbols are received, (e.g. using (n,k) nodes), the M different sequences can be distinguished. Since possible sequences can comprise k or more symbols from one base station or other transmitter, the MDS property can be used to disambiguate the symbols. In the configuration of the foregoing examples, n=64 and k=3; thus, if 16 consecutive clusters are received, 31 base stations, access points, or other transmitters having different synch metrics can be distinguished using this coding scheme; as well, other values for n and k can be used in other examples.

Additionally, time offset ambiguity can also be resolved where one or more clusters are detected and the location within the whole codeword is unknown. According to the theory of GFT on a finite field, shifting t symbols in the time domain can be equivalent to scaling $C_i$ by $w^{-it} = p^{-4it}$, for all i=0, . . . , 63 (time shifting property). In an example using the 22-bit synch code discussed previously, since $X_1$ has only 4 bits, and hence ranges from 0 to 15, not all code words are used to represent messages. For example, a message $(\hat{X}_1, \hat{X}_2, \hat{X}_3)$ can be received that is offset; according to the time shifting property, $p^{\hat{X}_1} = p^{X_1} p^{-16t}$, or equivalently $\hat{X}_1 = X_1 - 16t$, where t can be the shift in clusters. Then, $X_1 = \mod(\hat{X}_1, 16)$ and $$t = \frac{\hat{X}_1 - X_1}{16}.$$

Since the correct time offset t can be determined, the remaining two bytes $X_2$ and $X_3$ can be determined. The whole codeword, in this regard, is divided into 4 parts, and the message can be conveyed in a quotient space.

Furthermore, frequency shift ambiguity can be corrected by spacing between legal tones, in one example. If the frequency shift is sufficiently large, then in can change the codeword $(c_1, c_2, \ldots, c_{63})$ to $(c_1+\Delta, c_2+\Delta, \ldots, c_{63}+\Delta)$ where $\Delta$=frequency shift divided by T. The GFT of sequence $(\Delta, \Delta, \ldots, \Delta)$ is equal to $$\left(\frac{(1-w^{64})\Delta}{1-w}, 0, \ldots, 0\right),$$

which is not a codeword since $C_0$ equals 0 in the chosen Reed-Solomon code. Since the sequence $(\Delta, \Delta, \ldots, \Delta)$ is not a codeword, this can imply that $(c_1+\Delta, c_2+\Delta, \ldots, c_{63}+\Delta)$ is not a codeword either; thus, $\Delta$ can be detected to recover the original codeword resolving the frequency offset ambiguity.

In one example, however, detection of $\Delta$ can be time-consuming, and thus, an efficient algorithm can be utilized to find $\Delta$. The inverse GFT formula used to create the Reed-Solomon codeword, as mentioned, can be $$c_i = \frac{1}{n} \sum_{j=0}^{n-1} w^{-ij} C_j,$$

where $\{C_i\}_{i=0, \ldots, n-1}$ can be the components in the GFT domain and w can be an element with order (q−1)/n. In matrix form, the formula can be given by $\vec{c} = M\vec{C}$, where M can be transform matrix with $$M_{ij} = \frac{w^{-ij}}{n}.$$

If, in the GFT domain, the last k components are not constantly zero (e.g. they comprise data or other information), then the matrix form formula can be given by $\vec{c} = \tilde{M}\vec{C}^*$, where $\tilde{M}$ is an n×k matrix constructed by the last k columns of the matrix M, and $\vec{C}^*$ is a k-vector comprising the last k elements in $\vec{C}$. When a frequency offset exists in the received symbols, which can indicate a need for calibration of the receiving device, for example, the sequence can be given by:

$$\vec{\hat{c}} = \tilde{M}\vec{\hat{C}}^* + \Delta\vec{1},$$

where $\vec{1}$ is a column vector whose elements are all one. It is to be appreciated that the subspace Q spanned by the codewords is of dimension k and $\vec{1}$ does not fall in Ω. Thus, a vector $\vec{v}$, which is orthogonal to Ω but not to $\vec{1}$, can be determined. It is to be additionally appreciated that this vector $\vec{v}$ can be computed off-line and/or stored within memory, for example. By multiplying both sides of the above matrix equation by $\vec{v}^T$ on both sides, the estimation of $\Delta$ can be estimated as $$\Delta = \frac{\vec{v}^T \vec{\hat{c}}}{\vec{v}^T \vec{1}}.$$

Using this formula can efficiently produce the frequency bias since only the inner product can be needed for the numerator and denominator to be obtained off-line.

Figure 6:
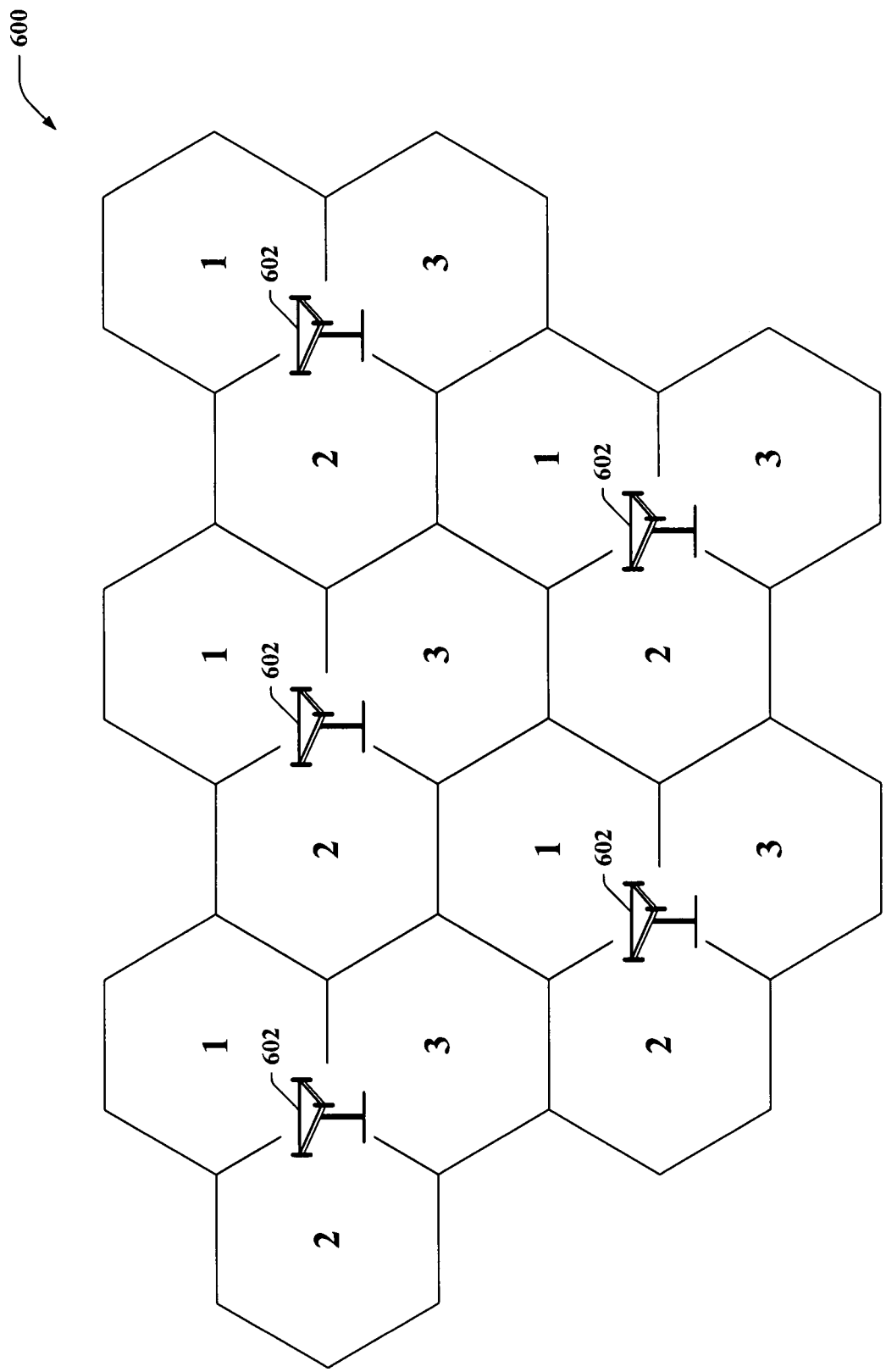
FIG. 6 is an illustration of an example wireless communications network.

Turning now to FIG. 6, a multi-cell layout 600 in a wireless communication network is shown. The network can comprise a plurality of base stations 602 having one or more transmission carriers or sectors; for example, as shown each base station can have 3 sectors, each of which can be assigned a specific carrier. In this figure, the carriers are adjacent from sectors using different carriers to mitigate interference on the carrier, for example. This can be referred to as frequency use having a factor of 3, for instance.

Beacon symbols in such a network configuration can be transmitted with or without reusing frequencies; for example, one carrier of the base station 602 can transmit a beacon symbol, or more than one carrier can transmit such. Additionally, data transmission can utilize such configurations as well creating some possible combinations of beacon and data use of carriers. In one example, both data and beacon symbols can be transmitted on a single carrier. This can reduce overhead for the beacon symbols as a preferred carrier can be used for both beacons and data. In another example, the beacon symbols can transmit on more than one carrier with the data on a single carrier. This configuration can allow mobile devices to detect beacons on the different carriers without interrupting current communications on a data carrier. Additionally, greater power can be given to the beacon symbol (e.g. facilitating pilot detection by out-of-band devices), in one example, as the data transmissions are not interrupted to allow transmission of the beacon. It is to be appreciated that other configurations are possible as well, such as the converse of the aforementioned configuration as well as having data and beacons use more than one of the available sectors for transmission.

As described previously, beacon codewords can be sent with information regarding the beacon or transmitter thereof (or substantially any information) to a plurality of mobile devices. In one example, the beacon codeword can be a 12-bit code that includes 9 bits for a sector identifier or a pilot PN, 2 bits for a preferred carrier index within a range of 0-3, and 1 reserved bit. It is to be appreciated that limitless possibilities of beacon message sizes and content are possible; this is just one example to facilitate further discussion. In an example, the base stations 602 can send similar or unique beacon messages to allow mobile devices to identify them. The base stations 602 can utilize the encoding schemes described supra to achieve the desired properties of efficient decoding, resolving ambiguities, etc. Also, the mobile devices (not shown) receiving the symbols can have the functionality to interpret the symbols accordingly.

Figure 7:
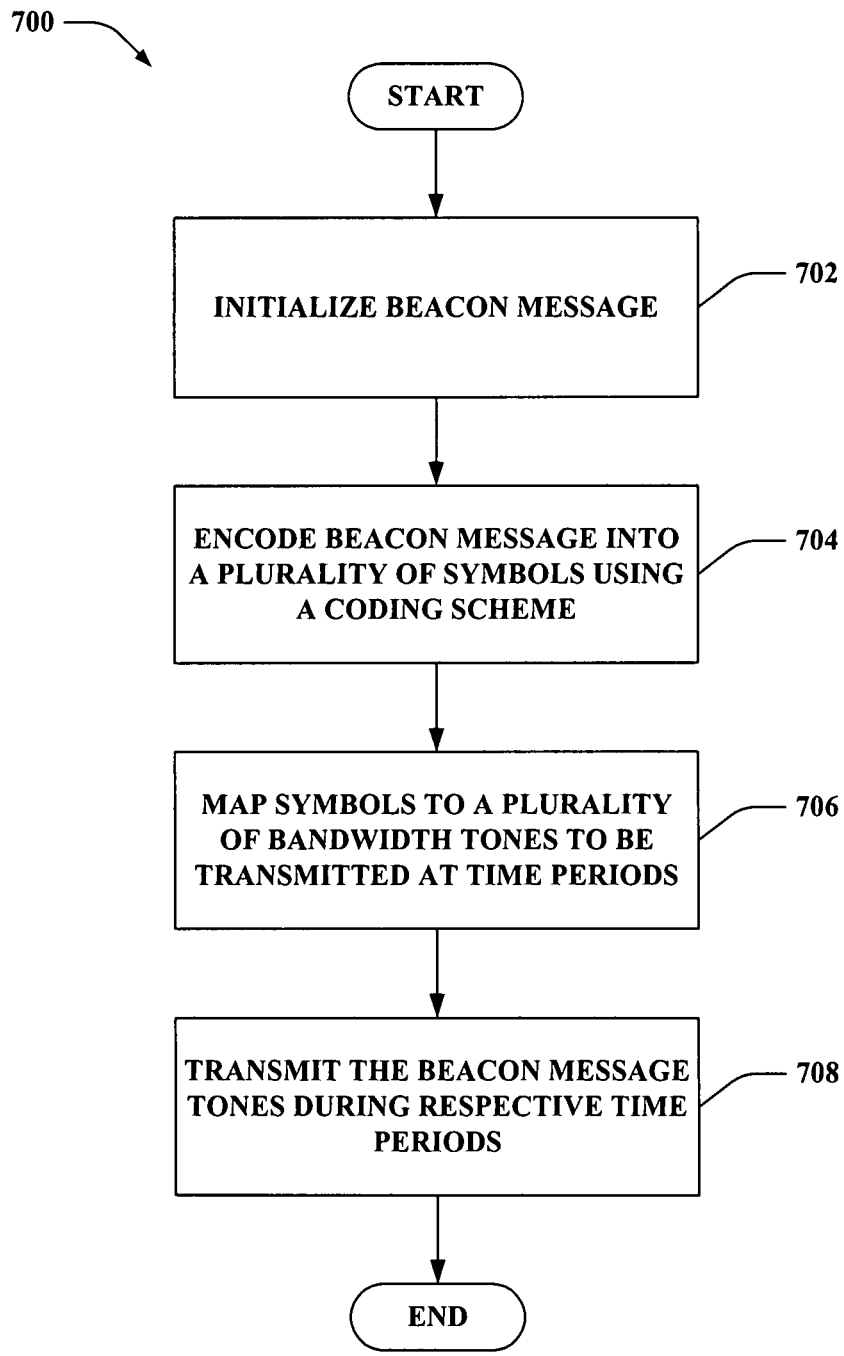
FIG. 7 is an illustration of an example methodology that facilitates transmitting a beacon message encoded using an encoding scheme.
Figure 8:
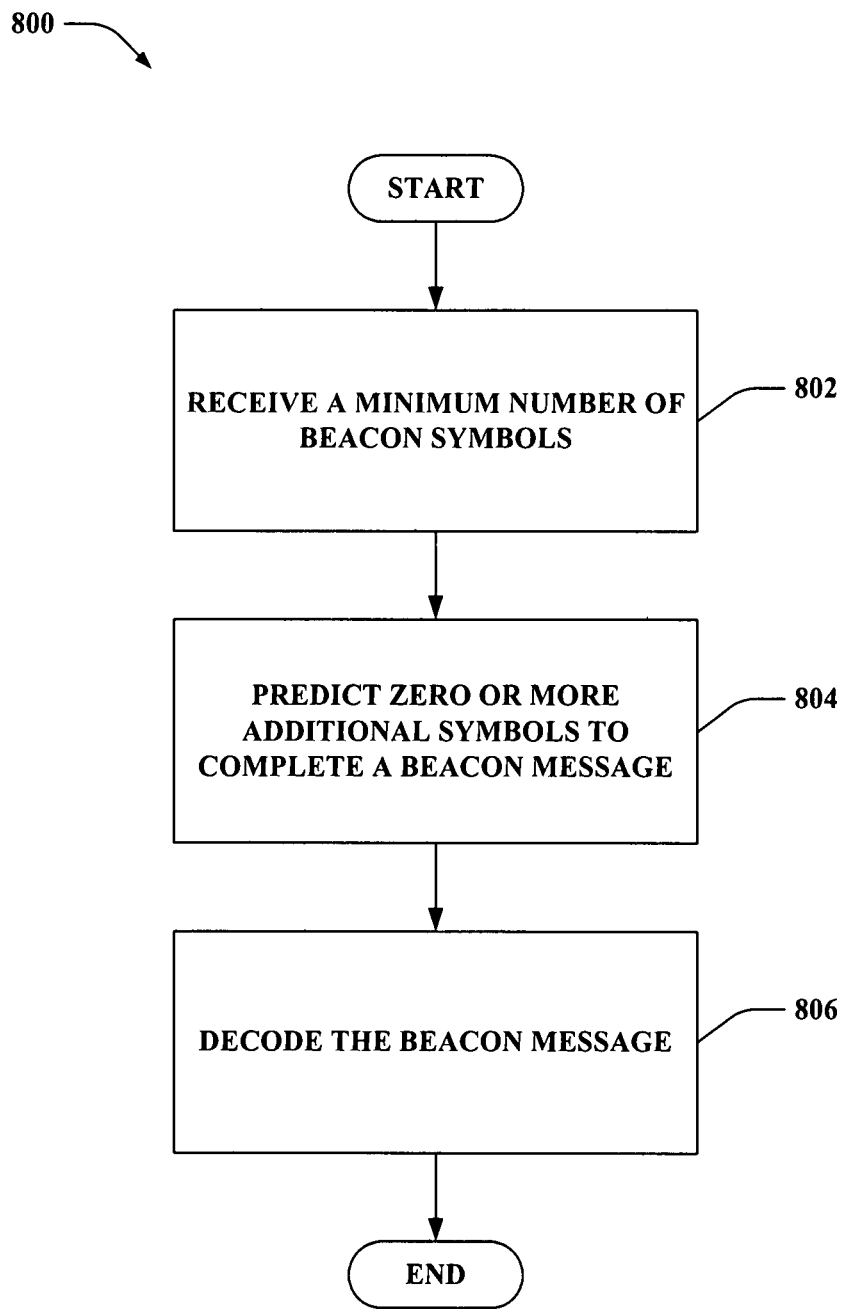
FIG. 8 is an illustration of an example methodology that facilitates receiving encoded beacon symbols to decode a beacon message.

Referring to FIGS. 7-8, methodologies relating to broadcasting and interpreting beacon symbols according to a beacon coding scheme are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, illustrated is a methodology 700 that facilitates encoding and transmitting a beacon according to a scheme having properties as those illustrated herein (e.g. efficient partial beacon decoding, ambiguity and shift resolution, etc.). At 702, a beacon message is initialized; the beacon message can comprise information regarding the beacon, a transmitter thereof, or substantially any information that is to be conveyed by the beacon, for example. The message can be of fixed or varying size; according to possible examples described herein, the beacon message can be 12-bits or a 22-bit synch metric, for instance. At 704, the beacon message can be encoded into a plurality of symbols using a coding scheme, such as those described herein including beacon code A, beacon code A', beacon code B, beacon code B', the Reed-Solomon beacon codes, the synch metrics, and/or variations thereof with substantially any variable values as described in the general examples.

The symbols can be OFDM symbols of certain periods within one or more superframes; during the symbol period, the beacon symbol can be transmitted on a subcarrier that corresponds to the created symbol. In this regard, the subcarrier chosen can be indicative of information in the beacon message. In one example, the beacon symbol can be the only symbol transmitting on a carrier during the specified symbol period. At 706, the symbols are mapped to a plurality of bandwidth tones to be transformed to a time domain for transmission of the beacon. The tones can be sent in a patterned sequence, for example, in one or more different time/symbol periods at 708. This can be in the form of a broadcast transmission using substantially all power of a carrier, in one example, to reach mobile devices that can be far away, for example.

Now referring to FIG. 8, a methodology 800 that facilitates receiving and decoding a plurality of beacon symbols is displayed. The beacon symbols can be part of a beacon message encoded as part of an coding scheme as described previously, including beacon code A, beacon code A', beacon code B, beacon code B', the Reed-Solomon beacon codes, the synch metrics, and/or variations thereof with substantially any variable values as described in the general examples. In this regard, the beacons can have the desired properties specified above, including partial beacon decoding, ambiguous beacon resolution, time and/or frequency offset resolution, etc. At 802, a minimum number of beacon symbols for decoding a beacon can be received. As described, in some cases, this can be a significantly less number of signals than the number in the entire beacon codeword. Additionally, the symbols can be received in certain time periods, consecutively, at random, etc.

At 804, utilizing the properties of the beacon code as explained above, zero or more additional symbols in the message can be predicted to complete the beacon message. This prediction can utilize the minimum number of symbols, as described above, to satisfy a linear constraint over a field relating to the symbols. Upon satisfying the constraint, the rest of the symbols are determined to form the complete beacon message. At 806, the beacon message can be decoded and interpreted to obtain information about the beacon and/or a transmitter thereof, for example. It is to be appreciated that the methodology can be employed to correct an offset frequency or time and/or resolve ambiguous beacon symbols being sent as well.

It will be appreciated that, in accordance with one or more aspects described herein, inferences can be made regarding selecting or determining a symbol subcarriers on which to send one or more beacon symbols as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting one or more symbol subcarriers for transmitting beacon symbols. By way of further illustration, an inference can be made with regard to information gathered about other entities transmitting beacon symbols (where acquired by the inferring entity or other entities moving about the transmission area). It will be appreciated that the foregoing examples are illustrative in nature and are not intended to limit the number of inferences that can be made or the manner in which such inferences are made in conjunction with the various embodiments and/or methods described herein.

Figure 9:
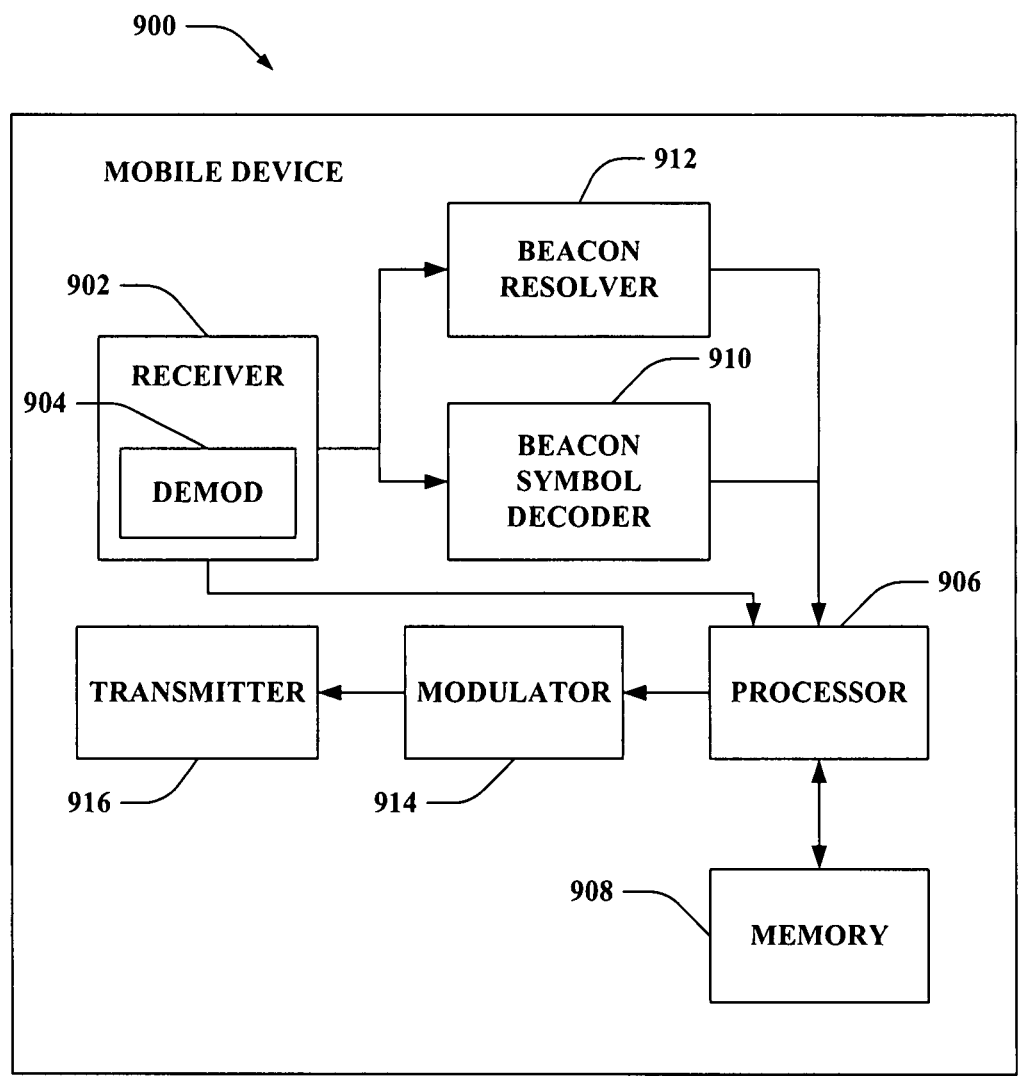
FIG. 9 is an illustration of an example mobile device that facilitates receiving beacon symbols across different beacon subcarriers.

FIG. 9 is an illustration of a mobile device 900 that facilitates receiving beacon symbols on a plurality of subcarriers (e.g. for a superframe in an OFDM communication network) that can indicate information, such as a beacon message. Mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of mobile device 900, and/or a processor that both analyzes information received by receiver 902, generates information for transmission by transmitter 916, and controls one or more components of mobile device 900.

Mobile device 900 can additionally comprise memory 908 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 908 can additionally store protocols and/or algorithms associated with estimating and/or utilizing a channel (e.g., performance based, capacity based, etc.). Moreover, the memory 908 can include instructions related to decoding beacons and symbols thereof and determining beacons from a minimum or requisite number of symbols less than the total amount of symbols in the beacon as described herein.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Receiver 902 is further operatively coupled to a beacon symbol decoder 910 that can decode and/or evaluate beacon symbols received over bandwidth to determine a subcarrier index that can relate to an element in a field related to the subcarriers of the bandwidth. The subcarrier index can be transmitted to the beacon resolver 912 where upon receiving a minimum number of other subcarrier indexes related to the beacon (e.g. symbols in a beacon codeword), the beacon symbol resolver 912 can determine the entire beacon symbol sequence of the beacon message, and decode the beacon message to obtain information about the beacon and/or a transmitter thereof, for example. The minimum number of symbols required to be received can be defined by the coding schemes presented supra. Additionally, the beacon resolver 912 can resolve ambiguity in beacons after receiving a number of symbols as described in reference to previous figures and example. Moreover, the beacon resolver 912 can cure time and/or frequency offset in the mobile device 900 utilizing the algorithms shown above. Mobile device 900 still further comprises a modulator 914 and a transmitter 916 that can transmit a communication signal to, for instance, a base station, another mobile device, etc. In one example, a response to a decoded beacon symbol can be sent. Although depicted as being separate from the processor 906, it is to be appreciated that beacon symbol decoder 910, beacon resolver 912 and/or modulator 914 can be part of processor 906 or a number of processors (not shown).

Figure 10:
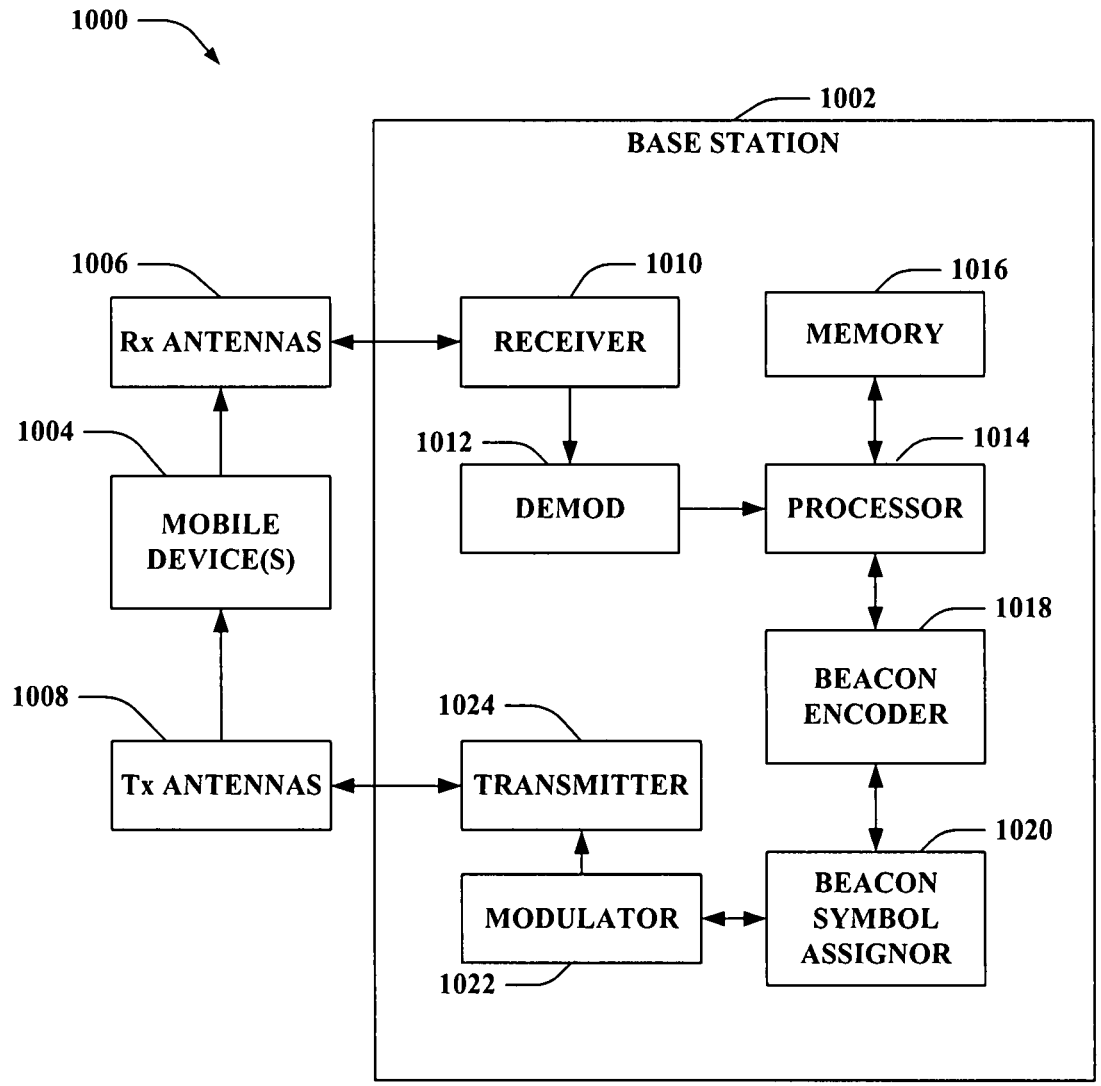
FIG. 10 is an illustration of an example system that facilitates broadcasting beacon symbols encoded using a coding scheme.

FIG. 10 is an illustration of a system 1000 that facilitates transmitting one or more beacon symbols in a beacon message on subcarriers that represent beacon message content. For example, the system 1000 can operate in an OFDM communication network where beacon symbols can be sent using one or substantially one subcarrier. The system 1000 comprises a base station 1002 (e.g., access point, . . . ) with a receiver 1010 that receives signal(s) from one or more mobile devices 1004 (and a demod 1012 that can demodulate such signals) through a plurality of receive antennas 1006, and a transmitter 1024 that transmits to the one or more mobile devices 1004 through a transmit antenna 1008. The transmitter 1024 can transmit one or more beacon symbols related to the base station 1002, for example. The beacon symbol can identify information regarding the base station 1002 and/or one or more sectors thereof. For example, the beacon symbol can serve to identify the base station 1002 and/or sector; additionally, the beacon symbol can be part of a beacon message that spans a plurality of beacon symbols in one example. The beacon symbol can be modulated to a frequency domain by the modulator 1022 and transmitted by one or more transmitter antennas 1008 using the transmitter 1024, for instance.

For example, the base station can leverage a beacon encoder 1018 to apply a coding scheme to a beacon message (such as beacon code A, A', B, B', the Reed-Solomon codes, the synch metrics, and/or substantially any code described herein in specific or general implementation). As described, substantially any coding scheme can be used that satisfies the desired properties of partial symbol interpretation, resolving ambiguities, resolving time and/or frequency offset, and the like, by creating a linear constraint over a field relating to a plurality of subcarriers of a carrier that must be satisfied by the subcarrier positions of the symbols of the beacon message. The beacon encoder 1018 can produce a plurality of subcarrier indices for various symbols to facilitate transmitting the desired message, and the beacon symbol assignor

1020 can properly assign the beacon symbols to the subcarriers and/or given time periods. After modulating the symbols with modulator 1022, the transmitter 1024 can broadcast the beacon symbols to one or more mobile devices 1004. As described, the mobile devices 1004 can apply decoding algorithms presented herein on a subset of the total number of beacon symbols in the code to efficiently interpret the beacon message. Additionally, a beacon code for a base station 1002 can be transmitted periodically as a repeating sequence and/or can be an infinite or one time sequence. In one example, the sequence of symbols for a beacon codeword can be dynamic as well. Additionally or alternatively, some or all of the beacon encoder 1018 and beacon symbol assignor 1020 can reside in, or be implemented by, the processor 1014. Furthermore, the memory 1016 can comprise instructions to facilitate the foregoing functionality. Moreover, the memory 1016 can comprise information regarding the symbol periods and/or subcarriers to use in transmitting the beacon symbols as well.

Figure 11:
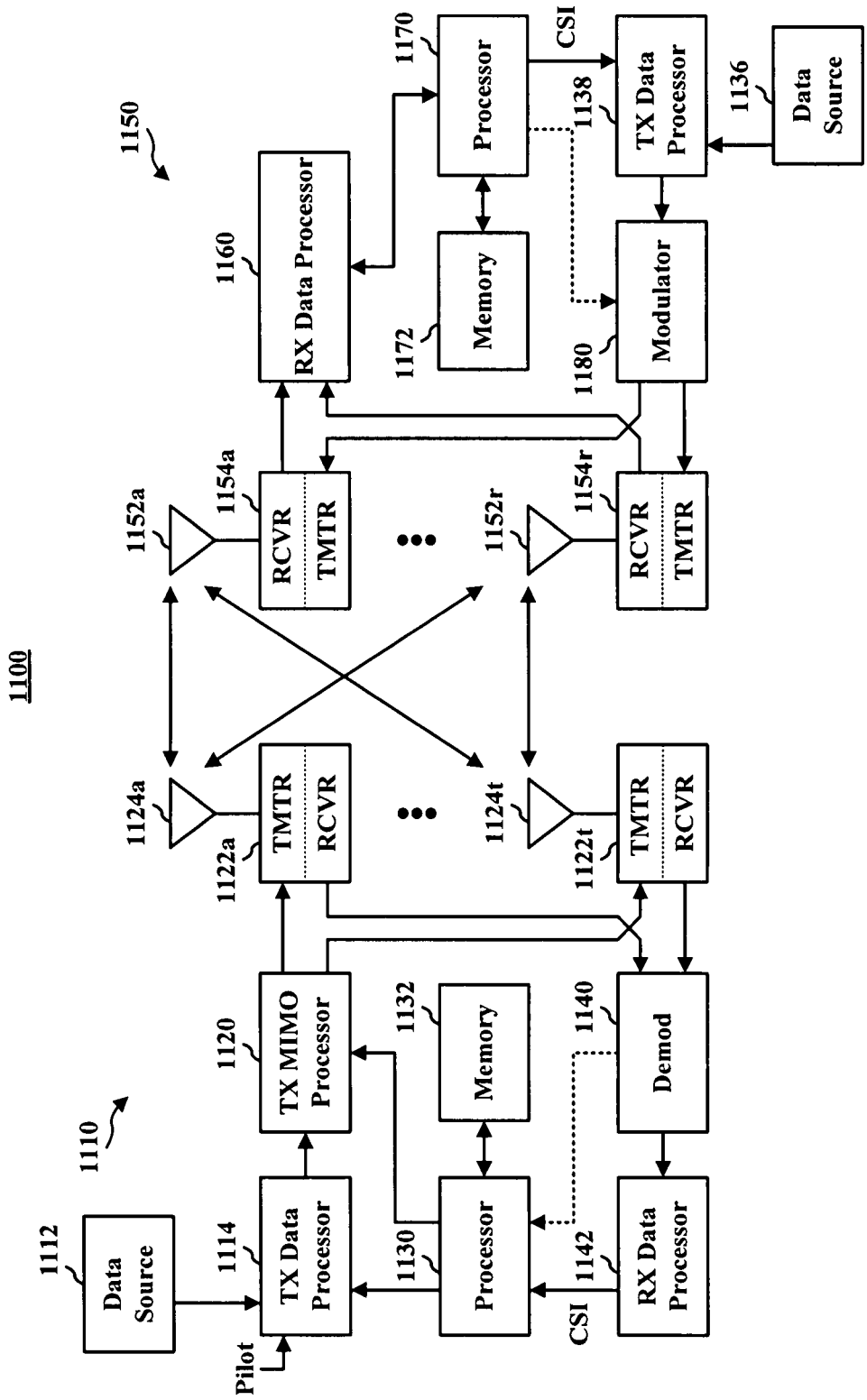
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 9-10), techniques/configurations (FIGS. 4-6) and/or methods (FIGS. 7-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which precoding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
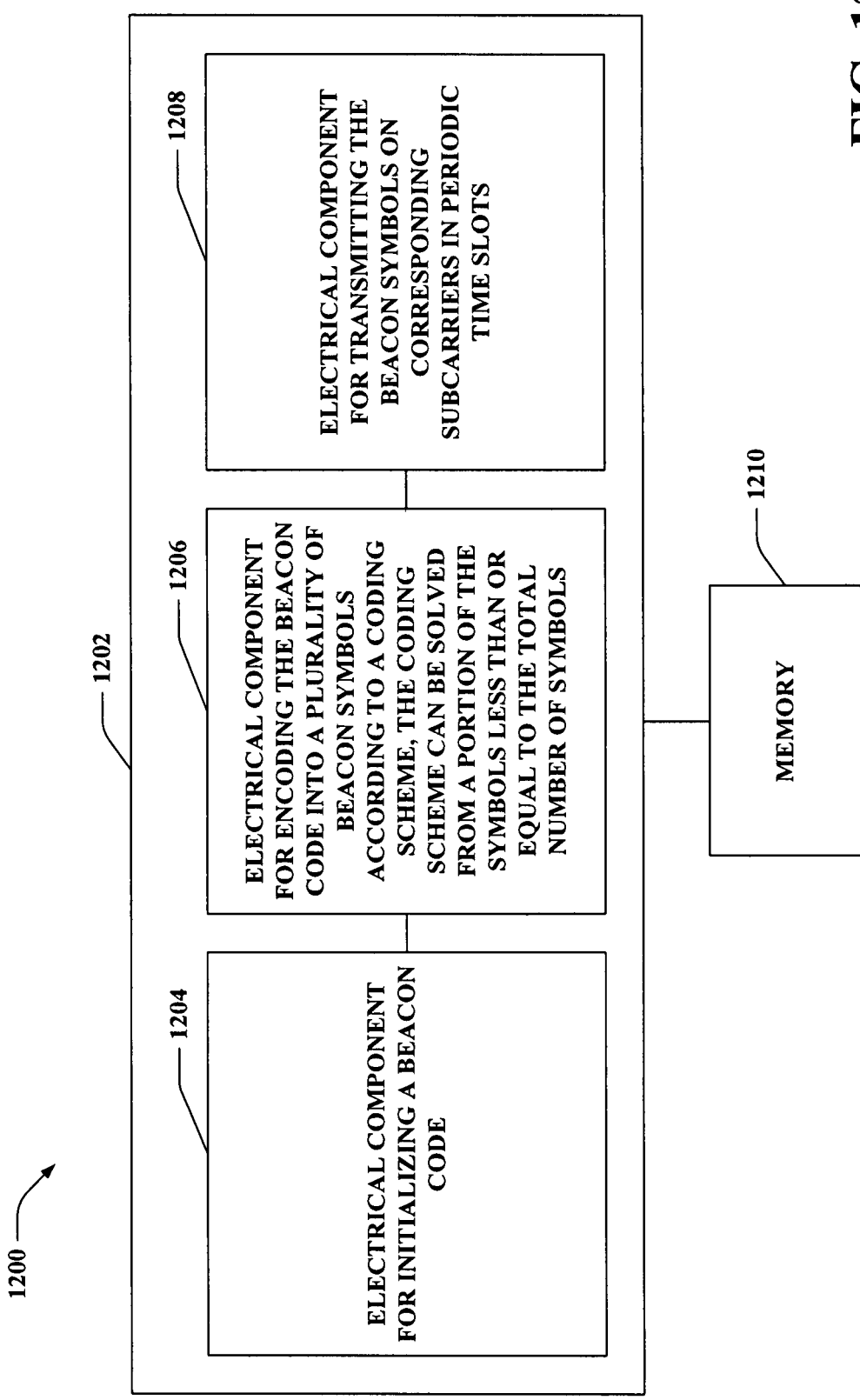
FIG. 12 is an illustration of an example system that transmits a beacon message of encoded beacon symbols.

With reference to FIG. 12, illustrated is a system 1200 that broadcasts encoded beacon symbols that can satisfy a linear constraint over a field related to a number of useable subcarriers for beacon transmission. For example, system 1200 can reside at least partially within a base station It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for initializing a beacon code 1204. For example, the beacon codeword can comprise information regarding a transmitting entity and/or communication therewith. As described previously, for example, the beacon codeword can be a 12-bit code and/or a 22-bit synch metric in two examples. It is to be appreciated that the beacon code can take on substantially any data configuration as well. Further, logical grouping 1202 can comprise an electrical component for encoding the beacon code into a plurality of beacon symbols according to a coding scheme, the coding scheme can be solved from a portion of the symbols less than or equal to the total number of symbols 1206. In one example, the subcarrier positions used to transmit the symbols can indicate a linear constraint that can be satisfied for a field relating to a total number of subcarriers (which can be a prime number, for example). Using this information, the beacon code can become deterministic after a small number of symbols are received by solving the linear constraint. Moreover, logical grouping 1202 can include an electrical component for transmitting the beacon symbols on the corresponding subcarriers in periodic time slots. As described, a receiving device can utilize the subcarrier position to determine the rest of the symbols of the beacon codeword that are not yet received to facilitate efficient decoding of the beacon codeword. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

Figure 13:
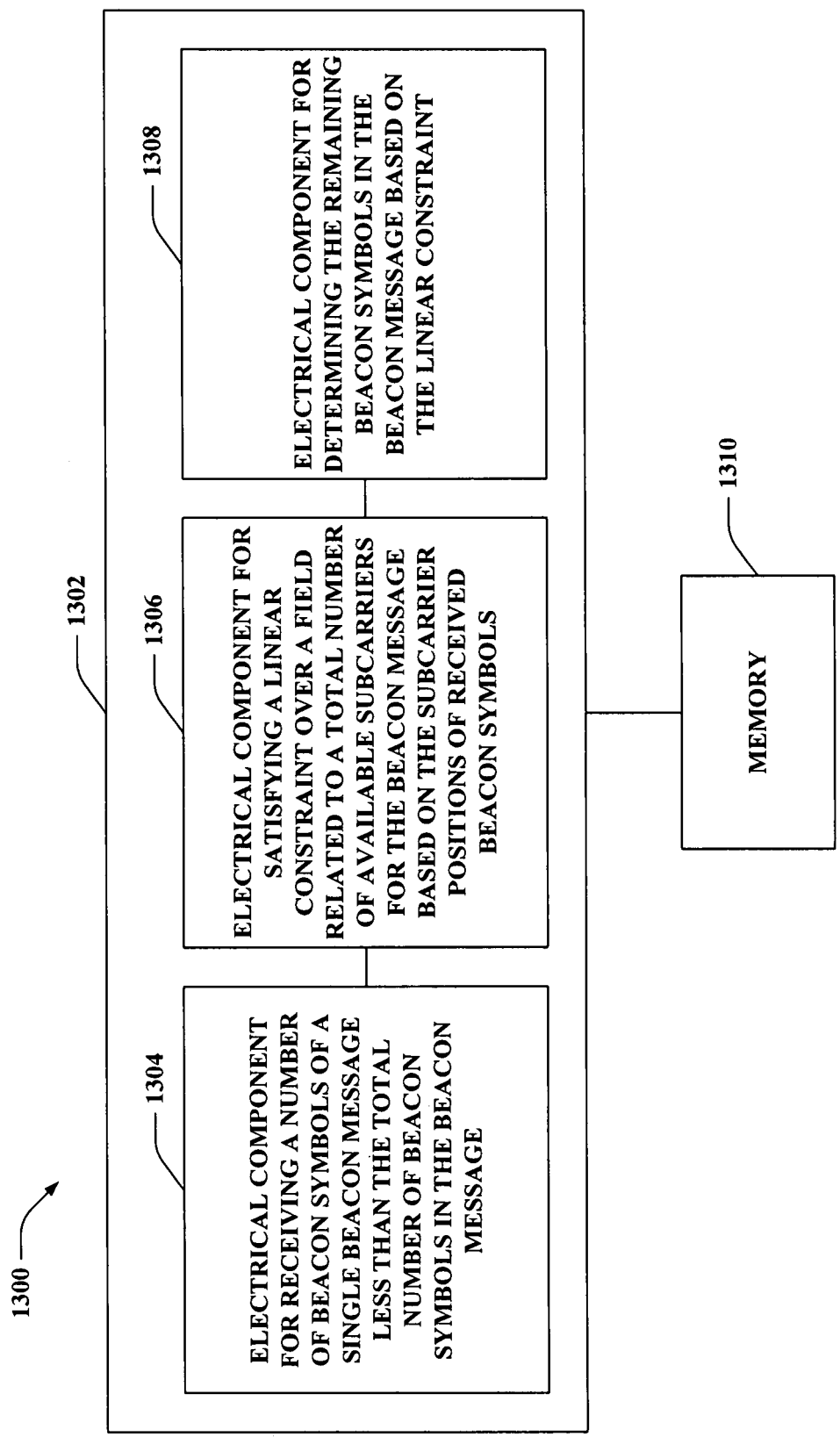
FIG. 13 is an illustration of an example system that receives an incomplete set of encoded beacon symbols for decoding a beacon message.

Turning to FIG. 13, illustrated is a system 1300 that receives a plurality of encoded beacon symbols and determines a beacon codeword based on receiving a portion of the symbols. System 1300 can reside within a mobile device, for instance. As depicted, system 1300 includes functional blocks that can represent functions implemented by a processor, software, or combination thereof (e.g., firmware). System 1300 includes a logical grouping 1302 of electrical components that facilitate receiving and decoding the beacon symbols. Logical grouping 1302 can include an electrical component for receiving a number of beacon symbols of a single beacon message less than the total number of beacon symbols in the message 1304. As will be described, the incomplete set of beacon symbols can be used to determine the rest of the symbols in the message; the number of symbols required can vary based in part on a number of exponential terms in a polynomial equation related to the beacon message. Moreover, logical grouping 1302 can include an electrical component for satisfying a linear constraint over a field related to a total number of available subcarriers for the beacon message based on the subcarrier positions of received beacon symbols 1306. As described, the beacon message can be encoded according to a coding scheme presented herein to produce beacon symbols that satisfy a linear constraint over the field of available subcarriers. A receiver of the beacon symbols can use this information in this regard to solve the linear constraint rendering the remainder of the beacon message deterministic. Therefore, logical grouping 1302 can comprise an electrical component for determining the remaining symbols in the beacon message based on the liner constraint 1308. Determining the beacon message can allow the message to be decoded to discern the information comprised therein. Additionally, system 1300 can include a memory 1310 that retains instructions for executing functions associated with electrical components 1304, 1306, and 1308. While shown as being external to memory 1310, it is to be understood that electrical components 1304, 1306, and 1308 can exist within memory 1310.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates transmitting a beacon message in wireless communications as a plurality of beacon symbols, comprising:
    encoding a beacon message as a plurality of beacon symbols such that a number of symbols, less than the total number for the beacon message, is utilized to determine remaining symbols of the beacon message; and
    transmitting the plurality of beacon symbols less than the total for the beacon message over respective subcarriers at assigned symbol periods;
    wherein the encoding of the beacon message enables decoding with less than the total number of beacon symbols in the plurality of beacon symbols to obtain more efficient decoding and resolution in wireless communications.

2. The method of claim 1, wherein the beacon message comprises information about at least one of a transmitting base station or a sector thereof.

3. The method of claim 1, wherein the beacon message is encoded using a maximum distance separable (MDS) code.

4. The method of claim 1, wherein the beacon message is further encoded such that a number of symbols, less than the total number for the beacon message, can be utilized to disambiguate the beacon message from a colliding beacon message.

5. The method of claim 1, wherein the beacon message is further encoded such that a number of symbols, less than the total number for the beacon message, can be utilized to detect and/or cure a time or frequency offset.

6. The method of claim 1, wherein the beacon message is encoded using a polynomial code that comprises at least one exponential term, wherein the polynomial code is given by:

$$X_t(\alpha_1, \ldots, \alpha_R) = p_1^{\alpha_1 + qt} \oplus p_2^{\alpha_2 + \alpha_1 + qt} \oplus \ldots \oplus p_R^{\alpha_1 + \ldots + \alpha_R + qt},$$

where R is the number of exponential terms, $p_1$ through $p_R$ are primitive elements of field $Z_S$ having S elements corresponding to S subcarriers useable for beacon transmission where S>1, $\alpha_1$ through $\alpha_R$ are exponent factors determined based on the beacon message, q is a parameter determined based on the length of the polynomial code and S, $X_t(\alpha_1, \ldots, \alpha_R)$ denotes a subcarrier to use for a beacon symbol sent in period t, and $\oplus$ denotes modulo addition.

7. The method of claim 6, wherein the polynomial code comprises two exponential terms and the beacon message is decodable based on two beacon symbols in the plurality of beacon symbols.

8. The method of claim 7, wherein the two exponential terms are formed with two primitive elements of a field $Z_{211}$ having 211 elements corresponding to 211 subcarriers useable for beacon transmission.

9. The method of claim 8, wherein the polynomial code is given by:

$$X_t(\alpha_1, \alpha_2) = p_1^{\alpha_1 + 21t} \oplus p_2^{\alpha_2 + \alpha_1 + 21t},$$

where $p_1$ and $p_2$ are primitive elements of field $Z_{211}$, $\alpha_1$ and $\alpha_2$ are exponent factors determined based on the beacon message, $X_t(\alpha_1, \alpha_2)$ denotes a subcarrier to use for a beacon symbol sent in symbol period t, and $\oplus$ denotes modulo-211 addition.

10. The method of claim 6, wherein the polynomial code is a Reed-Solomon code given by:

$$X_t(\alpha_1, \ldots, \alpha_R) = p_1^{\alpha_1 + qt} \oplus p_1^{\alpha_2} p_2^{qt} \oplus p_1^{\alpha_3} p_3^{qt} \oplus \ldots \oplus p_1^{\alpha_R} p_R^{qt},$$

where $p_1$ is a primitive element of field $Z_S$, having S elements corresponding to S subcarriers useable for beacon transmission, $p_m = p_1^m$ for m=2, ..., R, $\alpha_1$ through $\alpha_R$ are exponent factors determined based at least in part on the beacon message, $X_t(\alpha_1, \ldots, \alpha_R)$ denotes a subcarrier index to use for a beacon symbol sent in symbol period t, q is a parameter determined based on the length of the beacon code and S, and $\oplus$ denotes modulo addition, and $p_m = p_1^m$ for m=2, ..., R results in the Reed-Solomon code.

11. The method of claim 10, wherein S=211, R=2, q=21, $p_1$=207 and $p_2 = p_1^2$ =16.

12. The method of claim 6, wherein the polynomial code comprises three exponential terms and the beacon message is decodable based on three beacon symbols in the plurality of beacon symbols.

13. The method of claim 12, wherein the three exponential terms are formed with three primitive elements of a field $Z_{47}$ having 47 elements corresponding to 47 subcarriers useable for beacon transmission.

14. The method of claim 13, wherein the polynomial code is a given by:

$$X_t(\alpha_1, \alpha_2, \alpha_3) = p_1^{\alpha_1 + 2t} \oplus p_2^{\alpha_2 + \alpha_1 + 2t} \oplus p_3^{\alpha_3 + \alpha_1 + 2t},$$

where $p_1$, $p_2$, and $p_3$ are primitive elements of field $Z_{47}$, $\alpha_1$, $\alpha_2$ and $\alpha_3$ are exponent factors determined based on the beacon message, $X_t(\alpha_1, \alpha_2, \alpha_3)$ denotes a subcarrier to use for a beacon symbol sent in symbol period t, and $\oplus$ denotes modulo addition.

15. The method of claim 6, wherein the polynomial code is a Reed-Solomon code given by:

$$X_t(\alpha_1, \alpha_2, \alpha_3) = p_1^{\alpha_1 + 2t} \oplus p_1^{\alpha_2} p_2^{2t} \oplus p_1^{\alpha_3} p_3^{2t},$$

where $p_1$ is a primitive element of field $Z_{47}$, having 47 elements corresponding to 47 subcarriers useable for beacon transmission $p_2 = p_1^2$, $p_3 = p_1^3$, $\alpha_1$ and $\alpha_2$ are exponent factors determined based on the beacon message, $X_t(\alpha_1, \alpha_2, \alpha_3)$ denotes a subcarrier to use for a beacon symbol sent in symbol period t and $\oplus$ denotes modulo addition, the selection of $p_2 = p_1^2$ and $p_3 = p_1^3$ results in the Reed-Solomon code.

16. The method of claim 15, wherein $p_1$=45, $p_2 = p_1^2$ =4, and $p_3 = p_1^3$ =39.

17. The method of claim 1, wherein the beacon message is a synch metric sent in one or more clusters of beacons.

18. The method of claim 17, further comprising consecutively placing the encoded beacon symbols of a cluster in bytes of a Galois Fourier Transform (GFT) domain corresponding to the number of total beacon symbols in the one or more clusters of beacon codes and zeros in the remaining bytes.

19. The method of claim 18, further comprising transforming the components of the GFT domain into a codeword using an inverse GFT.

20. A wireless communications apparatus, comprising:
at least one processor configured to encode a beacon message as a plurality of beacon symbols such that upon resolving a number of symbols, less than the total number for the beacon message, the beacon message becomes deterministic to enable more efficient decoding and resolution where decoding is operable with less than the total number of beacon symbols in the plurality of beacon symbols; and
a memory coupled to the at least one processor.

21. The wireless communications apparatus of claim 20, wherein the at least one processor is further configured to transmit the beacon symbols during a defined symbol period and on a related subcarrier.

22. The wireless communications apparatus of claim 20, wherein the at least one processor is further configured to encode the beacon message using a maximum distance separable (MDS) code.

23. The wireless communications apparatus of claim 20, wherein the at least one processor is further configured to disambiguate a plurality of colliding beacons based on a portion of the beacon symbols thereof.

24. The wireless communications apparatus of claim 20, wherein the at least one processor is further configured to detect and/or cure a time or frequency offset based on a portion of the beacon symbols.

25. The wireless communications apparatus of claim 20, wherein the at least one processor is further configured to encode the beacon message using a polynomial code that comprises at least one exponential term, wherein the polynomial code is given by:

$$X_t(\alpha_1, \ldots, \alpha_R) = p_1^{\alpha_1 + qt} \oplus p_2^{\alpha_2 + \alpha_1 + qt} \oplus \ldots \oplus p_R^{\alpha_1 + \ldots + \alpha_R + qt},$$

where R is the number of exponential terms, $p_1$ through $p_R$ are primitive elements of field $Z_S$ having S elements corresponding to S subcarriers useable for beacon transmission where S>1, $\alpha_1$ through $\alpha_R$ are exponent factors determined based on the beacon message, q is a parameter determined based on the length of the polynomial code and S, $X_t(\alpha_1, \ldots, \alpha_R)$ denotes a subcarrier to use for a beacon symbol sent in period t, and $\oplus$ denotes modulo addition.

26. The wireless communications apparatus of claim 25, wherein the polynomial code comprises two exponential terms and the beacon message is decodable based on two beacon symbols in the plurality of beacon symbols.

27. The wireless communications apparatus of claim 26, wherein the two exponential terms are formed with two primitive elements of a field $Z_{211}$ having 211 elements corresponding to 211 subcarriers useable for beacon transmission.

28. The wireless communications apparatus of claim 27, wherein the polynomial code is given by:

$$X_t(\alpha_1, \alpha_2) = p_1^{\alpha_1 + 21t} \oplus p_2^{\alpha_2 + \alpha_1 + 21t},$$

where $p_1$ and $p_2$ are primitive elements of field $Z_{211}$, $\alpha_1$ and $\alpha_2$ are exponent factors determined based on the beacon message, $X_t(\alpha_1, \alpha_2)$ denotes a subcarrier to use for a beacon symbol sent in symbol period t, and $\oplus$ denotes modulo-211 addition.

29. The wireless communications apparatus of claim 25, wherein the polynomial code is a Reed-Solomon code given by:

$$X_t(\alpha_1, \alpha_2) = p_1^{\alpha_1 + 21t} \oplus p_1^{\alpha_2} p_2^{21t},$$

where $p_1$ is a primitive element of field $Z_{211}$ having 211 elements corresponding to 211 subcarriers useable for beacon transmission, $p_2 = p_1^2$, $\alpha_1$ and $\alpha_2$ are exponent factors determined based on the beacon message, $X_t(\alpha_1, \alpha_2)$ denotes a subcarrier to use for a beacon symbol sent in symbol period t and $\oplus$ denotes modulo addition, the selection of $p_2 = p_1^2$ results in the Reed-Solomon code.

30. The wireless communications apparatus of claim 29, wherein $p_1 = 207$ and $p_2 = p_1^2 = 16$.

31. The wireless communications apparatus of claim 25, wherein the polynomial code comprises three exponential terms and the beacon message is decodable based on three beacon symbols in the plurality of beacon symbols.

32. The wireless communications apparatus of claim 31, wherein the three exponential terms are formed with three primitive elements of a field $Z_{47}$ having 47 elements corresponding to 47 subcarriers useable for beacon transmission.

33. The wireless communications apparatus of claim 32, wherein the polynomial code is given by:

$$X_t(\alpha_1, \alpha_2, \alpha_3) = p_1^{\alpha_1 + 2t} \oplus p_2^{\alpha_2 + \alpha_1 + 2t} \oplus p_3^{\alpha_3 + \alpha_1 + 2t},$$

where $p_1$, $p_2$, and $p_3$ are primitive elements of field $Z_{47}$, $\alpha_1$, $\alpha_2$ and $\alpha_3$ are exponent factors determined based on the beacon message, $X_t(\alpha_1, \alpha_2, \alpha_3)$ denotes a subcarrier to use for a beacon symbol sent in symbol period t, and $\oplus$ denotes modulo addition.

34. The wireless communications apparatus of claim 32, wherein the polynomial code is a Reed-Solomon code given by:

$$X_t(\alpha_1, \alpha_2, \alpha_3) = p_1^{\alpha_1 + 2t} \oplus p_1^{\alpha_2} p_2^{2t} \oplus p_1^{\alpha_3} p_3^{2t},$$

where $p_1$ is a primitive element of field $Z_{47}$, having 47 elements corresponding to 47 subcarriers useable for beacon transmission $p_2 = p_1^2$, $p_3 = p_1^3$, $\alpha_1$ and $\alpha_2$ are exponent factors determined based on the beacon message, $X_t(\alpha_1, \alpha_2, \alpha_3)$ denotes a subcarrier to use for a beacon symbol sent in symbol period t and $\oplus$ denotes modulo addition, the selection of $p_2 = p_1^2$ and $p_3 = p_1^3$ results in the Reed-Solomon code.

35. The wireless communications apparatus of claim 34, wherein $p_1 = 45$, $p_2 = p_1^2 = 4$, and $p_3 = p_1^3 = 39$.

36. The wireless communications apparatus of claim 20, wherein the beacon message is a synch metric sent in one or more clusters of beacons.

37. The wireless communications apparatus of claim 36, wherein the at least one processor is further configured to consecutively place the encoded beacon symbols of a cluster in bytes of a Galois Fourier Transform (GFT) domain corresponding to the number of total beacon symbols in the one or more clusters of beacon codes and zeros in the remaining bytes.

38. The wireless communications apparatus of claim 37, wherein the at least one processor is further configured to transforming the components of the GFT domain into a codeword using an inverse GFT.

39. A wireless communications apparatus that encodes and transmits beacon symbols of a beacon message, comprising:
means for initializing a beacon message;
means for encoding the beacon message into a plurality of beacon symbols according to a coding scheme, wherein the coding scheme can be solved from a portion of the symbols less than the total number of symbols; and
means for transmitting the beacon symbols on corresponding subcarriers in periodic time slots;
wherein encoding of the beacon message by the means for encoding enables decoding with less than the total number of beacon symbols in the plurality of beacon symbols to obtain more efficient decoding and resolution.

40. The wireless communications apparatus of claim 39, further comprising means for identifying available subcarriers with a field such that subcarrier positions for the beacon symbols used for encoding must satisfy a linear constraint over the field.

41. The wireless communications apparatus of claim 39, wherein the coding scheme is a beacon code A, beacon code A', beacon code B, or beacon code B' coding scheme.

42. The wireless communications apparatus of claim 39, wherein the beacon message comprises information about at least one of the beacon message, a transmitting base station, or a sector thereof.

43. The wireless communications apparatus of claim 39, wherein the beacon message is encoded using a maximum distance separable (MDS) code.

44. The wireless communications apparatus of claim 39, wherein the beacon message is further encoded such that a number of beacon symbols, less than the total number for the beacon message, can be utilized to disambiguate the beacon message from a colliding beacon message.

45. The wireless communications apparatus of claim 39, wherein the beacon message is further encoded such that a number of beacon symbols, less than the total number for the beacon message, can be utilized to detect and/or cure a time or frequency offset.

46. The wireless communications apparatus of claim 39, wherein the beacon message is encoded using a polynomial code that comprises at least one exponential term;
wherein the polynomial code is given by:

$$X_t(\alpha_1, \ldots, \alpha_R) = p_1^{\alpha_1 + qt} \oplus p_2^{\alpha_2 + \alpha_1 + qt} \oplus \ldots \oplus p_R^{\alpha_1 + \ldots + \alpha_R + qt},$$

where R is the number of exponential terms, $p_1$ through $p_R$ are primitive elements of field $Z_S$ having S elements corresponding to S subcarriers useable for beacon transmission where $S > 1$, $\alpha_1$ through $\alpha_R$ are exponent factors determined based on the beacon message, q is a parameter determined based on the length of the polynomial code and S, $X_t(\alpha_1, \ldots, \alpha_R)$ denotes a subcarrier to use for a beacon symbol sent in period t, and $\oplus$ denotes modulo addition.

47. The wireless communications apparatus of claim 46, wherein the polynomial code comprises two exponential terms and the beacon message is decodable based on two beacon symbols in the plurality of beacon symbols.

48. The wireless communications apparatus of claim 47, wherein the two exponential terms are formed with two primitive elements of a field $Z_{211}$ having 211 elements corresponding to 211 subcarriers useable for beacon transmission.

49. The wireless communications apparatus of claim 48, wherein the polynomial code is given by:

$$X_t(\alpha_1,\alpha_2)=p_1^{\alpha_1+21t}\oplus p_2^{\alpha_2+\alpha_1+21t},$$

where $p_1$ and $p_2$ are primitive elements of field $Z_{211}$, $\alpha_1$ and $\alpha_2$ are exponent factors determined based on the beacon message, $X_t(\alpha_1,\alpha_2)$ denotes a subcarrier to use for a beacon symbol sent in symbol period t, and $\oplus$ denotes modulo-211 addition.

50. The wireless communications apparatus of claim 46, wherein the polynomial code is a Reed-Solomon code given by:

$$X_t(\alpha_1,\ldots,\alpha_R)=p_1^{\alpha_1+qt}\oplus p_1^{\alpha_2}p_2^{qt}\oplus p_1^{\alpha_3}p_3^{qt}\oplus \ldots \oplus p_1^{\alpha_R}p_R^{qt},$$

where $p_1$ is a primitive element of field $Z_S$, having S elements corresponding to S subcarriers useable for beacon transmission, $p_m = p_1^m$ for $m=2,\ldots,R$, $\alpha_1$ through $\alpha_R$ are exponent factors determined based at least in part on the beacon message, $X_t(\alpha_1, \ldots, \alpha_R)$ denotes a subcarrier index to use for a beacon symbol sent in symbol period t, q is a parameter determined based on the length of the beacon code and S, and $\oplus$ denotes modulo addition, and $p_m = p_1^m$ for $m=2,\ldots,R$ results in the Reed-Solomon code.

51. The wireless communications apparatus of claim 50, wherein S=211, R=2, q=21, $p_1$=207 and $p_2=p_1^2$=16.

52. The wireless communications apparatus of claim 46, wherein the polynomial code comprises three exponential terms and the beacon message is decodable based on three beacon symbols in the plurality of beacon symbols.

53. The wireless communications apparatus of claim 52, wherein the three exponential terms are formed with three primitive elements of a field $Z_{47}$ having 47 elements corresponding to 47 subcarriers useable for beacon transmission.

54. The wireless communications apparatus of claim 53, wherein the polynomial code is a given by:

$$X_t(\alpha_1,\alpha_2,\alpha_3)=p_1^{\alpha_1+2t}\oplus p_2^{\alpha_2+\alpha_1+2t}\oplus p_3^{\alpha_3+\alpha_1+2t},$$

where $p_1$, $p_2$, and $p_3$ are primitive elements of field $Z_{47}$, $\alpha_1$, $\alpha_2$ and $\alpha_3$ are exponent factors determined based on the beacon message, $X_t(\alpha_1, \alpha_2, \alpha_3)$ denotes a subcarrier to use for a beacon symbol sent in symbol period t, and $\oplus$ denotes modulo addition.

55. The wireless communications apparatus of claim 46, wherein the polynomial code is a Reed-Solomon code given by:

$$X_t(\alpha_1,\alpha_2,\alpha_3)=p_1^{\alpha_1+2t}\oplus p_1^{\alpha_2}p_2^{2t}\oplus p_1^{\alpha_3}p_3^{2t},$$

where $p_1$ is a primitive element of field $Z_{47}$, having 47 elements corresponding to 47 subcarriers useable for beacon transmission $p_2=p_1^2$, $p_3=p_1^3$, $\alpha_1$ and $\alpha_2$ are exponent factors determined based on the beacon message, $X_t(\alpha_1,\alpha_2,\alpha_3)$ denotes a subcarrier to use for a beacon symbol sent in symbol period t and $\oplus$ denotes modulo addition, the selection of $p_2=p_1^2$ and $p_3=p_1^3$ results in the Reed-Solomon code.

56. The wireless communications apparatus of claim 55, wherein $p_1$=45, $p_2=p_1^2$=4, and $p_3=p_1^3$=39.

57. The wireless communications apparatus of claim 39, wherein the beacon message is a synch metric sent in one or more clusters of beacons.

58. The wireless communications apparatus of claim 57, further comprising means for consecutively placing the encoded beacon symbols of a cluster in bytes of a Galois Fourier Transform (GFT) domain corresponding to the number of total beacon symbols in the one or more clusters of beacon codes and zeros in the remaining bytes.

59. The wireless communications apparatus of claim 58, further comprising means for transforming the components of the GFT domain into a codeword using an inverse GFT.

60. A computer program product, comprising:
a non-transitory computer-readable medium comprising:
code for causing at least one computer to initialize a beacon message with information regarding a transmitter of the beacon message;
code for causing the at least one computer to encode the beacon message to a plurality of beacon symbols to be sent out on subcarriers indicative of information, the beacon symbols being chosen according to a coding scheme where the beacon message can be decoded by obtaining a portion of the beacon symbols less than the total number of beacon symbols in the plurality of beacon symbols; and
code for causing at least one computer to transmit the beacon symbols on the subcarriers at determined symbol periods.

61. The computer program product of claim 60, wherein the coding scheme relates a number of available subcarriers to a field such that the portion of subcarriers for the beacon symbols satisfies a linear constraint over the field to determine the remaining beacon symbols.

62. In a wireless communication system, an apparatus comprising:
a processor configured to:
encode a beacon message into a plurality of beacon symbol positions according to a plurality of available positions;
relate the available positions to a field such that receiving a portion of the beacon symbol positions less than plurality of available positions and the total number of beacon symbols in the beacon message to render the rest of the beacon message deterministic by satisfying a linear constraint on the field; and
transmit the beacon symbols; and
a memory coupled to the processor.

63. A method for receiving a portion of beacon symbols that are utilized to decode a beacon message, comprising:
receiving a partial subset of encoded beacon symbols of a beacon which is less than the total number of beacon symbols in the beacon message and subcarrier positions of the encoded beacon symbols and satisfying a linear constraint over a field related to the total number of subcarrier positions useable for beacon symbols; and
determining information regarding the encoded beacon symbols based at least in part on the subcarrier position of the encoded beacon symbols and the resulting solution to the linear constraint to obtain more efficient decoding and resolution.

64. The method of claim 63, wherein the determined information comprises a frequency offset of the beacon.

65. The method of claim 64, wherein the offset is determined based on the partial set of encoded beacon symbols as compared to a valid set of beacon symbols, the difference in each beacon symbol and the valid set is the offset.

66. The method of claim 64, wherein the frequency offset is given by:

$$\hat{\vec{c}} = \tilde{M}\vec{C} + \Delta \vec{1},$$

where $\vec{c} = M\vec{C}$, is a matrix representation of a formula representing the beacon symbols in a Galois Fourier Transform (GFT) domain $$c_i = \frac{1}{n}\sum_{j=0}^{n-1} w^{-ij} C_j,$$

$\tilde{M}$ is an n×k matrix constructed by the last k columns of the matrix M, $\vec{C}$ is a k-vector comprising the last k elements in $\vec{C}$, and $\vec{1}$ is a column vector whose elements are all one.

67. The method of claim 66, where in the frequency offset is estimated by solving $$\Delta = \frac{\vec{v}^T \hat{\vec{c}}}{\vec{v}^T \vec{1}}$$

where $\vec{v}$ is a vector orthogonal to the subspace spanned by the beacon symbols.

68. The method of claim 67, where $\vec{v}$ is predetermined.

69. The method of claim 63, wherein the determined information comprises identifying one transmitter of the beacon where in collision with one or more other beacons.

70. The method of claim 63, wherein the determined information comprises remaining beacon symbols in the beacon.

71. The method of claim 70, further comprising decoding the beacon upon determining the remaining beacon symbols.

72. The method of claim 71, wherein the beacon comprises sector identification information.

73. The method of claim 70, wherein the beacon can be deterministic upon receiving a number of beacon symbols of a single beacon substantially equal to the number of exponential terms in a polynomial function related to the linear constraint.

74. The method of claim 70, wherein the beacon symbols are encoded using a maximum distance separable (MDS) code that,
is a Reed-Solomon code,
computed over a field more than 411 useable beacon subcarriers, the remaining symbols can be determined by representing 2 received symbols as $$x_1 = p_1^{\alpha_1 + 21t} \oplus p_1^{\alpha_2} p_2^{21t}, \text{ and}$$

$$x_2 = p_1^{\alpha_1 + 21(t+\Delta)} \oplus p_1^{\alpha_2} p_2^{21(t+\Delta)} = p_1^{21} p_1^{\alpha_1 + 21t} \oplus p_2^{21} p_1^{\alpha_2} p_2^{21t}$$

and solving for $p_1$ and its exponents.

75. The method of claim 74, wherein the Reed-Solomon code is computer over a field more than 411 useable beacon subcarriers, the remaining symbols can be determined by representing 2 received symbols as $$x_1 = p_1^{\alpha_1 + 2lt} \oplus p_1^{\alpha_2} p_2^{2lt}, \text{ and}$$

$$x_2 = p_1^{\alpha_1 + 2l(t+\Delta)} \oplus p_1^{\alpha_2} p_2^{2l(t+\Delta)} = p_1^{2l} p_1^{\alpha_1 + 2lt} \oplus p_2^{2l} p_1^{\alpha_2} p_2^{2lt}$$

and solving for $p_1$ and its exponents.

76. The method of claim 74, wherein the Reed-Solomon code is computed over a field less than 412 useable beacon subcarriers, the remaining symbols can be determined by representing 3 received symbols as $$x_1 = p_1^{\alpha_1 + 2t} \oplus p_1^{\alpha_2} p_2^{2t} \oplus p_1^{\alpha_3} p_3^{2t},$$

$$x_2 = p_1^{\alpha_1 + 2(t+1)} \oplus p_1^{\alpha_2} p_2^{2(t+1)} \oplus p_1^{\alpha_3} p_3^{2(t+1)}$$

$$= p_1^2 p_1^{\alpha_1 + 2t} \oplus p_2^2 p_1^{\alpha_2} p_2^{2t} \oplus p_3^2 p_1^{\alpha_3} p_3^{2t}, \text{ and}$$

$$x_3 = p_1^{\alpha_1 + 2(t+2)} \oplus p_1^{\alpha_2} p_2^{2(t+2)} \oplus p_1^{\alpha_3} p_3^{2(t+2)}$$

$$= p_1^4 p_1^{\alpha_1 + 2t} \oplus p_2^4 p_1^{\alpha_2} p_2^{2t} \oplus p_3^4 p_1^{\alpha_3} p_3^{2t}$$

and solving for $p_1$ and its exponents.

77. A wireless communication apparatus, comprising:
at least one processor configured to receive a subset of encoded beacon symbols of a beacon message which is less than the total number of beacon symbols in the beacon message, wherein a subcarrier position of the encoded beacon symbol satisfies a linear constraint over a field related to the total number of subcarrier positions useable for beacon symbols to obtain more efficient decoding and resolution; and
a memory coupled to the at least one processor.

78. The wireless communications apparatus of claim 77, wherein the at least one processor is further configured to resolve beacon message ambiguity by determining the beacon message based on the encoded beacon symbols satisfying the linear constraint.

79. The wireless communications apparatus of claim 77, wherein the at least one processor is further configured to resolve frequency and/or time offset by determining the beacon message and an offset related thereto based on the encoded beacon symbols satisfying the linear constraint.

80. The wireless communications apparatus of claim 77, wherein the at least one processor is further configured to determine remaining beacon symbols of the beacon message solving the linear constraint.

81. The wireless communications apparatus of claim 80, wherein the at least one processor is further configured to decode the beacon message upon determining the remaining beacon symbols.

82. The wireless communications apparatus of claim 77, wherein the beacon symbols are encoded using a maximum distance separable (MDS) code.

83. The wireless communications apparatus of claim 82, wherein the MDS code is a Reed-Solomon code.

84. The wireless communications apparatus of claim 83, wherein the Reed-Solomon code is computed over a field more than 411 useable beacon subcarriers, remaining symbols can be determined by representing 2 received symbols as $$x_1 = p_1^{\alpha_1 + 21t} \oplus p_1^{\alpha_2} p_2^{21t}, \text{ and}$$

$$x_2 = p_1^{\alpha_1 + 21(t+\Delta)} \oplus p_1^{\alpha_2} p_2^{21(t+\Delta)} = p_1^{21} p_1^{\alpha_1 + 21t} \oplus p_2^{21} p_1^{\alpha_2} p_2^{21t}$$

and solving for $p_1$ and its exponents.

85. The wireless communications apparatus of claim 84, wherein the Reed-Solomon code is computed over a field less than 412 useable beacon subcarriers, remaining symbols can be determined by representing 3 received symbols as $$x_1 = p_1^{\alpha_1 + 2t} \oplus p_1^{\alpha_2} p_2^{2t} \oplus p_1^{\alpha_3} p_3^{2t},$$

-continued $$x_2 = p_1^{\alpha_1+2(t+1)} \oplus p_1^{\alpha_2} p_2^{2(t+1)} \oplus p_1^{\alpha_3} p_3^{2(t+1)}$$
$$= p_1^2 p_1^{\alpha_1+2t} \oplus p_2^2 p_1^{\alpha_2} p_2^{2t} \oplus p_3^2 p_1^{\alpha_3} p_3^{2t}, \text{ and}$$

$$x_3 = p_1^{\alpha_1+2(t+2)} \oplus p_1^{\alpha_2} p_2^{2(t+2)} \oplus p_1^{\alpha_3} p_3^{2(t+2)}$$
$$= p_1^4 p_1^{\alpha_1+2t} \oplus p_2^4 p_1^{\alpha_2} p_2^{2t} \oplus p_3^4 p_1^{\alpha_3} p_3^{2t}$$

and solving for $p_1$ and its exponents.

86. A wireless communication apparatus for determining a beacon message based on a subset of received beacon symbols, comprising:
 means for receiving a number of beacon symbols of a single beacon message less than the total number of beacon symbols in the beacon message;
 means for satisfying a linear constraint over a field related to a total number of available subcarriers for the beacon message based on the subcarrier positions of received beacon symbols; and
 means for determining the remaining beacon symbols in the beacon message based on the linear constraint to obtain more efficient decoding and resolution.

87. The wireless communication apparatus of claim 86, further comprising means for resolving a frequency offset of the wireless communications apparatus by comparing the beacon symbols with a valid sequence of beacon symbols.

88. The wireless communication apparatus of claim 87, wherein the frequency offset is given by:

$$\hat{\vec{c}} = \tilde{M}\vec{C} + \Delta \vec{1},$$

where $\vec{c} = M\vec{C}$, is a matrix representation of a formula representing the beacon symbols in a Galois Fourier Transform (GFT) domain $$c_i = \frac{1}{n} \sum_{j=0}^{n-1} w^{-ij} C_j,$$

$\tilde{M}$ is an n×k matrix constructed by the last k columns of the matrix M, $\vec{C}$ is a k-vector comprising the last k elements in $\vec{C}$, and $\vec{1}$ is a column vector whose elements are all one.

89. The wireless communication apparatus of claim 88, where in the frequency offset is estimated by solving $$\Delta = \frac{\vec{v}^T \hat{\vec{c}}}{\vec{v}^T \vec{1}}.$$

where $\vec{v}$ is a vector orthogonal to the subspace spanned by the beacon symbols.

90. The method of claim 89, where $\vec{v}$ is predetermined.

91. The wireless communication apparatus of claim 86, further comprising means for resolving the beacon message in the presence of a colliding beacon message by satisfying the linear constraint.

92. The wireless communication apparatus of claim 86, wherein the beacon symbols encoded with a Reed-Solomon code.

93. The wireless communication apparatus of claim 86, further comprising means for decoding the beacon message upon determining the remaining beacon symbols.

94. The wireless communication apparatus of claim 86, wherein the beacon message comprises sector identification information.

95. The wireless communication apparatus of claim 86, wherein the beacon message can be deterministic upon receiving a number of beacon symbols of a single beacon substantially equal to the number of exponential terms in a polynomial function related to the linear constraint.

96. The wireless communication apparatus of claim 86, wherein the beacon symbols are encoded using a maximum distance separable (MDS) code.

97. The wireless communication apparatus of claim 96, wherein the MDS code is a Reed-Solomon code.

98. The wireless communication apparatus of claim 97, wherein the Reed-Solomon code is computed over a field more than 411 useable beacon subcarriers, the remaining symbols can be determined by representing 2 received symbols as $$x_1 = p_1^{\alpha_1+21t} \oplus p_1^{\alpha_2} p_2^{21t}, \text{ and}$$

$$x_2 = p_1^{\alpha_1+21(t+\Delta)} \oplus p_1^{\alpha_2} p_2^{21(t+\Delta)} = p_1^{21} p_1^{\alpha_1+21} \oplus p_2^{21} p_1^{\alpha_2} p_2^{21t}$$

and solving for $p_1$ and its exponents.

99. The wireless communication apparatus of claim 97, wherein the Reed-Solomon code is computed over a field less than 412 useable beacon subcarriers, the remaining symbols can be determined by representing 3 received symbols as $$x_1 = p_1^{\alpha_1+2t} \oplus p_1^{\alpha_2} p_2^{2t} \oplus p_1^{\alpha_3} p_3^{2t},$$

$$x_2 = p_1^{\alpha_1+2(t+1)} \oplus p_1^{\alpha_2} p_2^{2(t+1)} \oplus p_1^{\alpha_3} p_3^{2(t+1)}$$
$$= p_1^2 p_1^{\alpha_1+2t} \oplus p_2^2 p_1^{\alpha_2} p_2^{2t} \oplus p_3^2 p_1^{\alpha_3} p_3^{2t}, \text{ and}$$

$$x_3 = p_1^{\alpha_1+2(t+2)} \oplus p_1^{\alpha_2} p_2^{2(t+2)} \oplus p_1^{\alpha_3} p_3^{2(t+2)}$$
$$= p_1^4 p_1^{\alpha_1+2t} \oplus p_2^4 p_1^{\alpha_2} p_2^{2t} \oplus p_3^4 p_1^{\alpha_3} p_3^{2t}$$

and solving for $p_1$ and its exponents.

100. A computer program product, comprising:
 a non-transitory computer-readable medium comprising:
  code for causing at least one computer to receive an incomplete set of beacon symbol broadcasts related to a beacon message, the beacon symbols satisfy a linear constraint over a field related to usable subcarriers for transmitting the beacon symbol broadcasts; and
  code for causing at least one computer to solve the linear constraint with respect to the incomplete set of beacon symbol broadcasts to determine remaining beacon symbols in the beacon message to obtain more efficient decoding and resolution.

101. The computer program product of claim 100, wherein the non-transitory computer-readable medium further comprises code for causing the at least one computer to determine a frequency offset based on the beacon symbol broadcasts and a valid sequence of broadcasts for disparate beacon messages.

102. In a wireless communication system, an apparatus comprising:
 a processor configured to:
  receive an incomplete set of beacon symbols related to a beacon message;
  determine remaining beacon symbols of the beacon message based on utilizing the received beacon symbols to satisfy a linear constraint over a field; and
  decode the beacon message to discern information about a transmitting sector thereof to obtain more efficient decoding and resolution; and
 a memory coupled to the processor.

* * * * *